(12) United States Patent
Makeev et al.

(10) Patent No.: US 12,413,754 B2
(45) Date of Patent: Sep. 9, 2025

(54) METHODS AND APPARATUSES FOR HIERARCHICALLY ENCODING AND DECODING A BYTESTREAM

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 34 days.

(21) Appl. No.: 18/438,234

(22) Filed: Feb. 9, 2024

(65) Prior Publication Data

US 2024/0414364 A1    Dec. 12, 2024

Related U.S. Application Data

(63) Continuation of application No. 17/704,454, filed on Mar. 25, 2022, now Pat. No. 11,902,551, which is a
(Continued)

(30) Foreign Application Priority Data

Dec. 6, 2017 (EP) ..................................... 17386046
Feb. 8, 2018 (EP) ..................................... 18386002
(Continued)

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
CPC ........................... H04N 19/436; H04N 19/119
See application file for complete search history.

(56) References Cited

U.S. PATENT DOCUMENTS

2015/0264404 A1   9/2015  Hannuksela
2015/0304667 A1  10/2015  Suehring et al.
(Continued)

FOREIGN PATENT DOCUMENTS

WO          2017-195582        11/2017

OTHER PUBLICATIONS

International Search Report and Written Opinion for PCT/GB2018/053547 mailed Apr. 12, 2019.
(Continued)

*Primary Examiner* — Jerry T Jean Baptiste
(74) *Attorney, Agent, or Firm* — Workman Nydegger

(57) ABSTRACT

There may be provided a method of decoding a received set of encoded data representing information that has been compressed, wherein the encoded data set is divided into a hierarchy of subsets, the method comprising: decoding at least one first subset to derive a respective set of attribute metadata elements; separately decoding a plurality of second subsets comprising data elements, wherein each second subset describes a region of the information that has been compressed; and, reconstructing the information that has been compressed from the data elements, wherein the region of the information that has been compressed is identified from the attribute metadata elements.

20 Claims, 20 Drawing Sheets

Related U.S. Application Data continuation of application No. 16/770,228, filed as application No. PCT/GB2018/053547 on Dec. 6, 2018, now Pat. No. 11,297,339.

(30) Foreign Application Priority Data

Jul. 30, 2018 (GB) .................................... 1812407
Sep. 21, 2018 (GB) .................................... 1815437

(51) Int. Cl.
*H04N 19/129* (2014.01)
*H04N 19/167* (2014.01)
*H04N 19/176* (2014.01)
*H04N 19/182* (2014.01)
*H04N 19/30* (2014.01)
*H04N 19/44* (2014.01)
*H04N 19/46* (2014.01)
*H04N 19/91* (2014.01)
*H04N 19/96* (2014.01)

(52) U.S. Cl.
CPC ......... *H04N 19/167* (2014.11); *H04N 19/176* (2014.11); *H04N 19/182* (2014.11); *H04N 19/30* (2014.11); *H04N 19/44* (2014.11); *H04N 19/46* (2014.11); *H04N 19/91* (2014.11); *H04N 19/96* (2014.11)

(56) References Cited

U.S. PATENT DOCUMENTS

2016/0165321 A1    6/2016  Denoual et al.
2018/0295400 A1*  10/2018  Thomas ......... H04N 21/234327
2019/0342563 A1*  11/2019  Nakagami ............ H04N 19/132

OTHER PUBLICATIONS

U.S. Appl. No. 16/770,228, Dec. 3, 2021, Notice of Allowance.
U.S. Appl. No. 16/770,228, Mar. 16, 2022, Issue notification.
U.S. Appl. No. 17/704,454, Feb. 2, 2023, Office Action.
U.S. Appl. No. 17/704,454, Oct. 3, 2023, Notice of Allowance.
U.S. Appl. No. 17/704,454, Jan. 24, 2024, Issue Notification.
International Preliminary Report on Patentability received for PCT Patent Application No. PCT/GB2018/053547, mailed on Jun. 18, 2020, 15 pages.
Invitation to Pay Additional Fee received for PCT Patent Application No. PCT/GB2018/053547, mailed on Feb. 21, 2019, 14 pages.

* cited by examiner

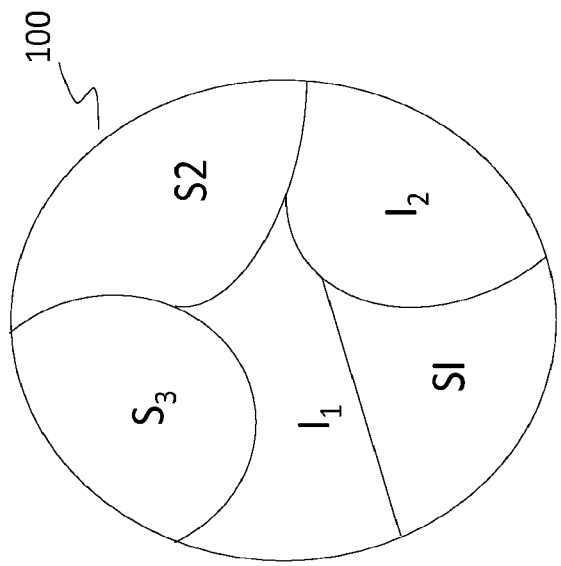
FIG 1A
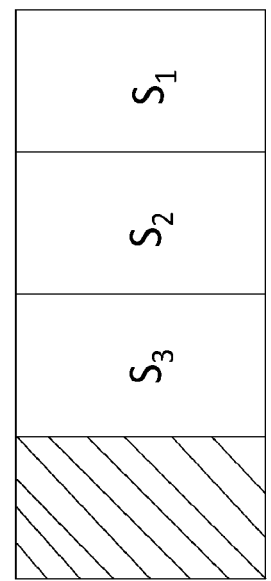
FIG 1D
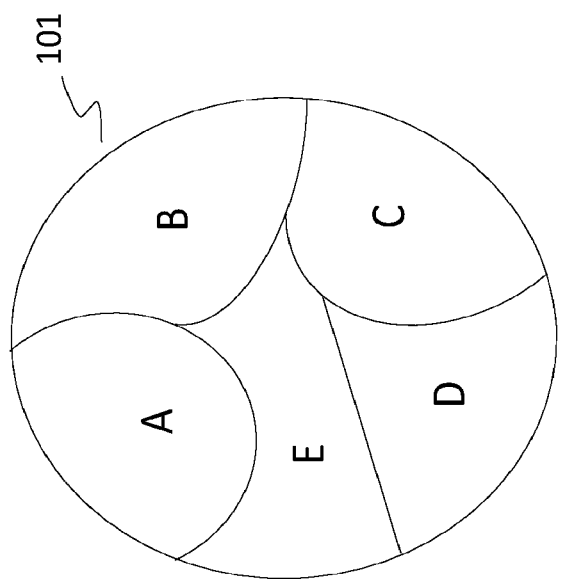
FIG 1B
FIG 1C

| A | "1xxx" | "1111" | YES Tree (16,16) | YES Tree (16,16) | YES Tree (16,16) | YES Tree (16,16) | NO (16,16) | NO (5,16) | YES Tree (16,16) | NO (5,16) | NO (16,10) | YES Tree (16,10) | YES Tree (16,10) | YES Tree (5,10) |

FIG 6

"1x1x" "0010" "1010" ZERO ZERO Data ZERO Data ZERO Data ZERO "10xx" "10xx" Data ZERO ZERO ZERO

METHODS AND APPARATUSES FOR HIERARCHICALLY ENCODING AND DECODING A BYTESTREAM

CROSS-REFERENCE TO RELATED APPLICATIONS

The present application is a continuation of U.S. patent application Ser. No. 17/704,454, filed Mar. 25, 2022, which is a continuation U.S. patent application Ser. No. 16/770,228, filed Jun. 5, 2020 (issued as U.S. Pat. No. 11,297,339 on Apr. 5, 2022), which is a 35 U.S.C. § 371 US Nationalization of PCT/GB2018/053547, filed Dec. 6, 2018, which claims the benefit of and priority to UK Patent Application Nos. 1815437.7, filed Sep. 21, 2018, and 1812407.3, filed Jul. 30, 2018, and EP Patent Application Nos. 18386002.2, filed Feb. 8, 2018, and 17386046.1, filed Dec. 6, 2017. The disclosures of the aforementioned patent applications are enclosed herewith in their entireties.

BACKGROUND OF THE INVENTION

1. Technical Field

The present invention relates to methods, apparatuses, computer programs and computer-readable media for encoding and/or decoding a sequence of data streams such as a bytestream.

When transmitting, or storing, image and video data it is particularly advantageous to reduce the size of the data. Techniques for encoding and decoding such data are varied and well known. Contemporary techniques provide a compromise between processing efficiency, data quality and data compression.

Images are typically represented digitally by representing the colours of an image by a set of components each having a value. For example, the colours of an image can be represented using an RGB colour model or the YCbCr colour space where each pixel of an image is represented by three different values.

To compress the data, planes of the image are usually first split into blocks of data elements, such as blocks of 8×8 pixels, and each block undergoes a domain transformation. Examples include discrete cosine transform and wavelet transform. As is well known in the art, transformation coding is used to capture correlation structures in the data.

The transformed data is then quantized to represent the large set of values using a smaller set of values and then typically undergoes a further compression step, such as entropy coding. Entropy coding utilises frequently occurring values or sequences of values within a data set in order to reduce the volume of data. For example, an entropy coding technique compresses the digital data by representing frequently occurring patterns with few bits and rarely occurring patterns with many bits.

The efficacy of each step depends on the outcome of the previous step. That is, the transformation and quantisation processes are designed to make the next step in the process more effective. For example, overall compression can be made more effective if the transform and quantisation processes represent the values of the image with frequently occurring symbols or groups of symbols so that the entropy coding step is more effectual.

In order to make the entropy encoding step more effectual, some contemporary transformation processes (which occur prior to entropy encoding) produce a large number of zero value data elements. Such a data set having a large number of zero value elements, either grouped together or otherwise, can be referred to as a sparse data set. Run length encoding is often performed as part of the encoding step to reduce these zero data values.

The output of the entropy coding operation is thus a stream of data and the decoding operation is performed in a mirrored manner to the encoding operation. First the stream of data is decoded to recreate the information. To generate a series of blocks, the stream is divided and mapped to a plane of data using an inverse of the process used at the encoder and the blocks are then arranged in their location in the plane according to the order in which the blocks were received in the stream. For example, in a typical JPEG algorithm the blocks are arranged in a in left to right, top to bottom pattern and within each block coefficients are arranged in a zig-zag or serpentine pattern. The blocks are then de-quantised. The blocks are then domain transformed using, for example a wavelet or discrete cosine transformation.

There remains difficulty in optimising the decoding process for example to take advantage of parallel decoding optimisations or separate decoding of subsets of the stream. Each block is concatenated with the other blocks and sent as one stream and therefore to accurately install each transformed block in the correct location in the plane each of the previous blocks must have been decoded sequentially from the combined stream—the order of the blocks as they appear in the stream dictates the location of the block in the grid.

Similarly, to search for and access each block in a stream to allow for parallel or separate decoding is not possible without decoding the previous blocks. Imagine some kind of boundary symbol between blocks. Then one wouldn't be able to search for a desired block, but the system would be able to search for a block (one cannot say which one; one can just grab a boundary symbol guaranteed to be used for no other reason) and access the block. Additionally, some entropy encoding algorithms will conflate the blocks such that they can't be separated unless the entire steam is decoded in one entropy decoding operation. Alternatively, if each of the parts of the stream have a variable length (in most coding algorithms) identifying suitable boundaries in the data to enable separating the stream into subsets is difficult without compromising compression, further reinforcing the need for sequential decoding.

To implement parallel processing, it has previously been proposed to divide the image data into multiple parts and combine compressed streams. An alternative approach that has been proposed is to scan the compressed stream for boundaries in the encoded data or alternatively insert markers in the stream with predefined codes to aid the scanning process. None of the proposed approaches have been shown to be optimal.

2. Description of Related Art

It has been previously proposed to encode data in a hierarchical manner so as to reduce the overall data size of a signal. In such encoding techniques, residual data (i.e. the data required to correct low quality information present in a base layer) is used in progressively higher levels of quality. Such a hierarchical technique is described in WO 2013/171173 which proposes a tiered hierarchy of renditions of a signal. In this proposed technique, a base layer of quality represents the image at a first resolution and subsequent layers in the tiered hierarchy are residual data or adjustment layers necessary for the decoding side to reconstruct the image at a higher resolution. Techniques are proposed in this WO 2013/171173 which structure the data in each layer to exploit correlation in the residual layers to reduce information entropy by transforming a block of values into a set of directional components. Each layer in this hierarchical technique, particularly each residual layer, is often a comparatively sparse data set having many zero value elements.

The concept of a hierarchical, tiered data structure is also disclosed in earlier filed patent application GB1812407.3. Both of GB1812407.3 and WO2013/171173 are incorporated by reference.

It has previously been proposed to store sparse matrices using quadtrees. The techniques build a tree to store the spatial structure of the matrix. When considering any possible implementation of the known formats for reconstructing images using sparse matrices, each requires intensive memory usage. Each of the known formats that demonstrate efficiency gains require a large amount of data to be stored in memory to properly reconstruct the locations and values of the data in a matrix.

It remains a goal of industry to reduce the size of image and video data stored or transmitted and to reduce the processing time and memory utilisation of encoding or decoding sparse data sets in image reconstruction.

BRIEF SUMMARY OF THE INVENTION

According to a first aspect of the present invention there is provided a method of decoding a received set of encoded data representing information that has been compressed, wherein the encoded data set is divided into a hierarchy of subsets, the method comprising: decoding at least one first subset to derive a respective set of attribute metadata elements; separately decoding a plurality of second subsets comprising data elements, wherein each second subset describes a region of the information that has been compressed; and, reconstructing the information that has been compressed from the data elements, wherein the region of the information that has been compressed is identified from the attribute metadata elements.

It is provided that individual portions of a bytestream can be decoded without reference to other similar sections of the same bytestream. This facilitates increased memory utilisation as each portion, once separately decoded, can be spatially located in the information being compressed without having any knowledge of the other similar sections and without additional information being stored in memory. The data in memory at an instant may be a subset of the data of a whole plane. Conventionally, an entire plane is decoded as one such that it cannot be broken to enable separate decoding. By separately we consider that the first subset may be separately decoded from the second subsets, the second subsets may be decoded separately from other, or preferably both. That is, that each subset is decoded separately from any other subset.

Each second subset may comprise a data structure of structure metadata elements and data elements and reconstructing the information that has been compressed from the data elements may comprise spatially arranging the data elements in an array based on the structure metadata elements. Thus each of the second subsets may themselves be a data structure. In this way the proposed technique can be thought of as the breaking down and reconstruction of a larger data structure with each part of the data structure being separately decodable so that data stored within each structure can be spatially located without knowledge of the other parts of the data set.

Reconstructing the information that has been compressed may comprise: inserting a predetermined series of data values in regions of the array where the attribute metadata elements indicate that no second subset is included in the dataset for a region of the array. Regions of the information which have consistent values need not be signalled explicitly in the bytestream and therefore the overall size of the data can be reduced. This may be thought of as sparsifying the data. The hierarchical data structure provides a mechanism by which a region implicitly signalled in the data set can be accurately located and the information contained therein populated without that region being included within the bytestream or decoded at the decoder. Not only does this reduce data size but it also dramatically increases decoding speed as swathes of subsets do not need to be decoded for largely consistent data arrays, such as residuals.

The attribute metadata elements may indicate the predetermined series of data values for a respective one of the plurality of second subsets. It thus becomes possible to signal the large swathes of information above differently where there are different consistent regions within a plane or between planes. Alternatively, the predetermined series of data values may be known to the decoder and may be zero values.

The attribute metadata elements may comprise a flag indicating that no second subset is included in the dataset for a region of the array. The flag facilitates the decoder identifying that a subset is not expected in the dataset for that region. Where the first subsets correspond to a first tier of the hierarchical data structure and the second subsets correspond to a second tier of the hierarchical data structure, the flag may indicate if a corresponding data structure exists in a subsequent tier.

Each of the attribute metadata elements may describe a respective one of the plurality of second subsets. For example, the attribute metadata elements may indicate specific attributes or parameters of a specific one of the second subsets. In this way, one first subset may describe a plurality of second subsets. Where the first subsets correspond to a first tier of the hierarchical data structure and the second subsets correspond to a second tier of the hierarchical data structure, the data structure may be visually represented as an inverted pyramid or tree. Each attribute metadata element may accordingly correspond to a sub-grid of an overall-grid to be decoded.

In general, the technique proposes the concept of separately decoding data structures using information contained within a different data structure.

The attribute metadata elements may comprise the dimensions of a data structure in a respective one of the plurality of second subsets. Thus when decoding the second subsets and placing the subsets in the array, the decoder is able to identify the expected shape and size of the data for placing in the region. Alternatively, the dimensions may be signalled separately or may be of a fixed size for each tier of the hierarchy.

The attribute metadata elements may comprise location information to enable the decoder to locate a respective one of the plurality of second subsets, and the step of separately decoding a plurality of second subsets may further comprise: searching for at least one of the plurality of second subsets based on the location information. The attribute metadata elements thus provide for the parallel decoding of the second subsets and the random access of those subsets such that each does not need to be decoded to accurately recreate portions of the information that has been compressed. The location information may be for example lengths of subsets, an offset from a location in the dataset or a fixed location in the data set.

The attribute metadata elements may indicate decoding parameters. The decoding parameters may be used by the decoder to differentially decode the second subsets from one another and thus improve the efficiency of the overall decoding process as parameters can be optimised for each subset. The decoding parameters may for example be entropy decoding parameters such as statistics or an indication of statistics to use for decoding a subset. Additionally, parameters signalled by the attribute elements may be quantization parameters.

The plurality of second subsets may be decoded based on the attribute metadata elements. Where the attribute metadata elements indicate decoding parameters the decoding may be performed according to those parameters to improve decoding efficiency. Where the attribute metadata elements include for example a length of the second subset or dimensions of the data structure, the decoder may be tailored to that particular subset to improve overall efficiency. In the art, typically the entirety of the data elements or the entirety of a graph is decoded together and is not decoded separately and therefore such benefits of decoding each subset differently cannot be realised.

The method may further comprise: mapping the attribute metadata elements to a first tier of a hierarchical data structure; and, mapping each decoded second subset to a second tier of the hierarchical data structure. The mapping of each subset to a tier in a data structure facilitates the implementation of the spatial location of the subsets. Once the information has been decoded it can be placed in the data structure. The data structure may be a linear data structure or a non-linear data structure such as a graph. This technique allows a data structure to be broken into sections which can be decoded separately and the data structure to be subsequently recreated at the decoder without explicitly signalling the data structure. That is, an unbroken graph may be broken into a series of graphs or separate data structures which can be separately decoded. Optionally, the decoded second subset may be grated to the decoded attribute metadata elements. For example, where the first and second subsets are a each portions of a graph, metadata of a second subset may replace leafs of first subset graph to recreate an unbroken graph.

The method may further comprise: mapping each data element of the second subsets to an array based on its location in the data structure. In this way the spatial location of the original data elements in the original data structure is maintained where the data structure reflects an array of information. The mapping of the data to a data structure helps identify the spatial location without storing the data structure in memory.

Each decoded second subset may be mapped to the hierarchical data structure based on the attribute metadata elements. For example, the method may comprise mapping each decoded second subset to a location in the second tier of the hierarchical data structure based on the attribute metadata elements. The attribute metadata elements may indicate that a location of the second tier of the data structure does not correspond to a second subset.

The mappings may be performed according to a predetermined order, for example a Morton or z-order. Alternatively the ordering of the second subsets may be indicated in the attribute metadata elements. The spatial information of the data set or data structure may be varied by explicit signalling in the attribute metadata elements.

The encoded data set may further comprise a plurality of first subsets, and the method may further comprise mapping a subset of the plurality of first subsets to a root tier of the hierarchical data structure; mapping another subset of the plurality of the first subsets to an intermediate tier of the hierarchical data structure, wherein the attribute metadata elements of the root tier describe the first subset of the intermediate tier. In this way the hierarchy may be increased to multiple tiers such that a large amount of data can be encoded and decoded in manageable portions. The process may be recursed for multiple tiers.

The first subset may be a data structure comprising structure metadata which indicate that no attribute metadata element is included in the first subset for a location in the data structure and that a corresponding location of the second tier does not correspond to a second subset. In this way the overall size of each subset may be reduced and the decoder may be able to easily identify that a regions of the array should be recreated as having consistent values without a suitable attribute metadata element being explicitly included in the subset.

Preferably the data elements may be data symbols and the set of attribute metadata elements may be in the form of a tuple.

According to a further aspect of the invention there may be provided an apparatus for decoding a received set of encoded data representing information that has been compressed, comprising a processor configured to carry out the method of the above aspect.

According to a further aspect of the invention there may be provided a method of encoding information to be compressed into an encoded set of data, wherein the encoded data set is to be divided into a hierarchy of subsets, the method comprising: retrieving a set of data values; encoding a set of attribute metadata elements into a respective at least one first subset; separately encoding the data values into data elements of a plurality of second subsets, wherein each second subset is arranged to describe a region of the information to be compressed, such that the region of the information that has been compressed is identified from the attribute metadata elements. Each second subset may comprise a data structure of structure metadata elements and data elements and wherein the method may further comprise generating the structure metadata elements based on a spatial arrangement of the data elements in an array. The method may further comprise: identifying regions of an array comprising a predetermined series of data elements, wherein the attribute metadata elements indicate that no second subset is included in the dataset for the region of the array comprising the predetermined series of data elements. The attribute metadata elements may be configured to indicate the predetermined series of data values for a respective one of the plurality of second subsets. The attribute metadata elements may be configured to comprise a flag indicating that no second subset is included in the dataset for a region of the array. Each of the attribute metadata elements may describe a respective one of the plurality of second subsets. The attribute metadata elements may comprise the dimensions of a data structure in a respective one of the plurality of second subsets. The attribute metadata elements may comprise location information to enable a decoder to locate a respective one of the plurality of second subsets. The attribute metadata elements may indicate encoding parameters. The plurality of second subsets may be encoded based on the attribute metadata elements. The method may further comprise: mapping the attribute metadata elements to a first tier of a hierarchical data structure; and, mapping each second subset to a second tier of the hierarchical data structure. The method may further comprise: mapping each data value to a data element location of the second subsets in the data structure based on its location an array. Each second subset may be mapped to the hierarchical data structure based on the attribute metadata elements. The attribute metadata elements may indicate that a location of the second tier of the data structure does not correspond to a second subset. The mappings may be performed according to a predetermined order. The method may further comprise: encoding a set of attribute metadata elements into a plurality of first subsets, mapping a subset of the plurality of first subsets to a root tier of the hierarchical data structure; mapping another subset of the plurality of the first subsets to an intermediate tier of the hierarchical data structure, wherein the attribute metadata elements of the root tier describe the first subset of the intermediate tier. The first subset may be a data structure comprising structure metadata which indicate that no attribute metadata element is included in the first subset for a location in the data structure and that a corresponding location of the second tier does not correspond to a second subset.

According to a further aspect there may be provided an apparatus for encoding information to be compressed into an encoded set of data, comprising a processor configured to carry out the method of the above aspect.

According to a further aspect of the present invention there is provided a method of reconstructing information that has been compressed from an encoded data set, the encoded data set comprising a plurality of subsets, the method comprising: decoding each of the plurality of subsets to derive a series of data values for each subset; identifying an order of the subsets; reconstructing the information that has been compressed by: mapping each subset to a region of the grid according to the identified order of the subsets; and, mapping each data value of the subset to locations in the region of the grid, such that the data values of the encoded data set are placed in a correct location in the grid to reconstruct the information that has been compressed. In this way a decoding module can recreate a plane or array of information from an encoded data set where the encoded data set does not itself indicate the spatial location of the data explicitly.

In certain embodiments, each of the plurality of subsets represents a tile of a plane such that the regions of the gild are non-overlapping geometric shapes. For example, the process may be considered similar to a process of tessellation where the mapping process is a process to tessellate a plane of data from a set of tiles. In this context, tessellation may be thought of as a tessellation of a flat surface being the tiling of a plane using one or more geometric shapes, called tiles, with no overlaps and no gaps. Preferably the tiles may be rectangular or square where the plane is a two-dimensional array of data. Square tiles may be used for the majority of the plane of information except at the periphery of the plane where rectangular regions may be utilised to fill the extent of the dimensions of the plane.

In certain embodiments a tableau may refer to all or a section of a plane comprising multiple tiles for example each subset may be a tile comprising multiple data symbols and multiple tiles may be represented by a tableau, the tableau being a different subset of the data and a separate layer in a hierarchical data structure pointing to multiple tiles in a higher layer.

Preferably, each data value is mapped to the region of the grid according to an order in which the data values occur in the subset. Spatial location can be determined by the order in which the subsets are decoded and when combined with the mapping can be preserved without explicit signalling. Each subset may be mapped to a region of the grid in a predefined arrangement.

Each data value may be mapped to the locations according to a predetermined arrangement. Thus the arrangement of the values in each location may be predetermined.

The predetermined arrangement may preferably be a Morton order. This may alternatively be considered a z-order. This order provides a methodology for the decoding process to map each decoded region and/or data value to a region or location of the grid.

In a preferred embodiment, the encoded data set may comprise a plurality of additional subsets comprising metadata which combine with the plurality of subsets to represent a hierarchical data structure, the method comprising: decoding each of the plurality of additional subsets to derive a series of metadata elements which describe the hierarchical data structure, wherein the plurality of subsets and the plurality of additional subsets correspond to layers of the hierarchical data structure and each layer of the hierarchical data structure corresponds to a sub-grid of the grid and wherein the method comprises: mapping each subset to a region of the gild according to a location of the subset in the hierarchical data structure. The mapping of the hierarchical data structure to a plane is thus facilitated.

The metadata elements may indicate sections of the hierarchical data structure which do not correspond to a subset of the plurality of subsets. Thus the metadata elements may signal to the decoder where data is not included and thus the technique signals areas of a plane implicitly without the decoder explicitly receiving data for that section or having to decode any data elements of a bytestream or bitstream.

The method may further comprise inserting a predetermined value at locations in the grid where no subset or data value has been mapped to the grid. Thus regions of the grid or regions of a plane which have a consistent value can be mapped without such data elements and spatial locations being signalled in the bytestream or bitstream.

Additionally, the method may further comprise associating the plurality of subsets and the plurality of additional subsets with a node of an ordered tree according to the identified order of the plurality of subsets; traversing the ordered tree. The traversal may be performed according to a predetermined traversal. By traversing the tree of the hierarchical data structure, each layer can be mapped to a corresponding section of a plane.

Further, the method may comprise mapping each of the plurality of subsets to a region of the grid in a predetermined arrangement according to a sequence in which a respective node associated with each of the plurality of subsets is visited in the traversal. Thus the spatial information to map the information of each tile or block to the plane can be inferred from the construction of a tree.

The method may further comprise associating the data values with a node of the ordered tree. Thus not only are the regions of a plane identified by locations within a tree but the data values of that region may also be identified from that same tree.

The method may further comprise mapping the data values to locations in the region of the grid in a predetermined arrangement according to a sequence in which a respective node associated with each data of data values of a tile or block to a plane can be inferred from the construction of a tree.

The traversal may be a depth-first pre-order traversal. This selection has particular computational efficiency when used in combination with other aspects of this disclosure.

According to a further aspect of the invention there may be provided an apparatus for reconstructing information that has been compressed from an encoded data set, comprising a processor configured to carry out the method of the above aspect.

According to a further aspect of the invention there may be provided a method of encoding information to be compressed into an encoded data set comprising a plurality of subsets, the method comprising: mapping each region of a grid to a plurality of subset having a defined order; mapping each data value of locations in each region of the grid to a respective subset; encoding each of the plurality of subsets to encode the data values for each respective subset. Each of the plurality of subsets may represent a tile of a plane such that the regions of the grid are non-overlapping geometric shapes. Each data value may be mapped to the subset in a defined order. Each subset may be mapped from a region of the grid in a predefined arrangement. Each data value may be mapped from the locations according to a predetermined arrangement. The predetermined arrangement may be a Morton order. Encoding a plurality of additional subsets may comprise metadata which combine with the plurality of subsets to represent a hierarchical data structure, the method may comprise: encoding a series of metadata elements into each of the plurality of additional subsets which describe the hierarchical data structure, wherein the plurality of subsets and the plurality of additional subsets correspond to layers of the hierarchical data structure and each layer of the hierarchical data structure corresponds to a sub-grid of the grid and wherein the method comprises: mapping each subset from a region of the grid according to a location of the subset in the hierarchical data structure. The metadata elements may indicate sections of the hierarchical data structure which do not correspond to a subset of the plurality of subsets. The method may further comprise not mapping a region or data value locations of the grid have a predetermined value. The method may further comprise: associating the plurality of subsets and the plurality of additional subsets with a node of an ordered tree to generate the defined order of the plurality of subsets; traversing the ordered tree. The method may further comprise mapping each region of the grid to the plurality of subsets in a predetermined arrangement according to a sequence in which a respective node associated with each of the plurality of subsets is visited in the traversal. The method may further comprise associating the data values with a node of the ordered tree. The method may further comprise mapping each data value of locations in each region of the grid to a respective subset in a predetermined arrangement according to a sequence in which a respective node associated with each data value is visited in the traversal. The traversal may be a depth-first pre-order traversal.

According to a further aspect there may be provided an apparatus for encoding information to be compressed into an encoded data set comprising a plurality of subsets, comprising a processor configured to carry out the method of the above aspect.

According to a further aspect of the present invention there is provided a method of decoding a received set of encoded data representing information that has been compressed, the encoded data set comprising a plurality of subsets, each subset representing a region of the information that has been compressed, the method comprising: receiving the encoded data set; retrieving signalled size dimensions of the information that has been compressed; based on the signalled size dimensions, identifying a maximum amount of subsets expected in the data set, the subsets comprising a predetermined maximum amount of encoded data elements, and identifying an expected amount of data elements to be represented by each subset; decoding the encoded data set to derive a set of data elements based on the expected amount of data elements represented by each subset; and, reconstructing the information that has been compressed using the derived set of data elements.

The size dimensions may be an amount of elements in width and height in a 2-dimensional plane or grid. Since each subset represents a region of the information that has been compressed, it may follow that each subset represents a maximum size region of the information that has been compressed as the subsets comprise a maximum amount of elements.

This technique provides what may be referred to herein and elsewhere as active volume or active area. The technique provides for the signalling and inference of an area of a plane for which data is to be expected and filled, i.e. active, and other areas outside this area which are inactive and are not to contain valid data elements.

Techniques herein are particularly advantageous as they provide facility for a decoding process to optimise its allocation of data and processes without a predetermined knowledge of the expected data to be decoded. The data and processes may also thus be dynamic and highly replicable.

The step of identifying an expected amount of data elements within each subset may be based on an order the subsets are retrieved from the encoded data set. Thus the technique can identify the next region to be retrieved, or decoded, may be a smaller region as it is likely to be mapped to a periphery of a plane of data for example. The step of identifying an expected amount of data elements within each subset may based on a defined mapping order of the subsets to the corresponding region of the information that has been compressed. A defined mapping may be predetermined or signalled for example.

The step of decoding the encoded dataset may comprises masking any data or metadata in the encoded data set which corresponds to a location in the information that has been compressed outside of the signalled size dimensions based on the defined mapping order of the subsets. In this way, the data set may be signal data or metadata that is not to be included in a plane of information but may serve another purpose. The masked bits may be ignored or may be completely redundant but they may also optionally improve encoding characteristics for example to reduce signalling using an entropy coding technique or may be used by a separate decoding process to derive other insights or infer other conclusions from the encoded data set.

Each subset may be a data structure comprising metadata elements and data symbols.

The method may further comprise, based on the signalled size dimensions, identifying which metadata elements comprise relevant metadata and which contain dummy metadata. Thus the decoding process is able to infer from the dimensions how to process the data set and can optimise its processes accordingly. Preferably, the method may comprise ignoring dummy metadata. Thus the method is operable to only process information which contributes to the active region of interest.

Based on the signalled dimensions, the method may further comprise identifying a structure of the data structure.

Structure may refer to shape or format for example. Thus the processing of the data set may be optimised for the dimensions of the data encoded.

Each data structure may be associated with a square array of data elements and each metadata element may correspond to a square sub-array of the square array. Thus the tiles may be square and fill the extent of a plane. At the periphery, the square data structures may contain only rectangular data elements corresponding to the size dimensions such that the plane is filled to its extent.

The data structure may preferably only comprise data symbols for information that has been compressed within the size dimensions, based on a defined mapping order of the data symbols to the information that has been compressed. Nevertheless in certain examples the metadata may be included for the entire square area of the data structure even though only data elements for the active part of the plane are included. The signalled dimensions may indicate portions of the data structure do not contain data elements. Thus the decoder can infer features of the data structures from only a few bits of signalled size dimensions.

The step of reconstructing may comprise: mapping each derived data element to a location in an array based on a defined order and the signalled size dimensions, such that derived data elements are placed only at locations within the signalled size dimensions. Thus the technique may reconstruct a plane of data from the data of the encoded data set and its signalled dimensions.

As indicated, a technique is proposed to signal using a few bits the size of information to be compressed. In this way, a decoding process can make optimisations on its decoding process and can infer properties or features of the encoded data set which reduce the overall size of the data. This technique is particularly advantageous when used in combination with other aspects of the disclosure.

According to a further aspect of the invention there may be provided an apparatus for decoding a received set of encoded data representing information that has been compressed, comprising a processor configured to carry out the method of the above aspect.

According to a further aspect of the invention there may be provided a method of encoding information to be compressed into a set of encoded data, the encoded data set comprising a plurality of subsets, each subset representing a region of the information that has been compressed, the method comprising: identifying size dimensions of the information to be compressed; signalling the size dimensions of the information that has been compressed; encoding data elements of the information to be compressed into the plurality of subsets, the subsets comprising a predetermined maximum amount of encoded data elements. The step of encoding the data elements may comprise inserting data or metadata in the encoded data set which corresponds to a location in the information that has been compressed outside of the signalled size dimensions. Each subset may be a data structure comprising metadata elements and data symbols. The method may further comprise inserting dummy metadata elements in the data structure. Each data structure may be associated with a square array of data elements and wherein each metadata element corresponds to a square sub-array of the square array. The data structure may only comprises data symbols for information that has been compressed within the size dimensions, based on a defined mapping order of the data symbols to the information that has been compressed. The step of encoding may comprise: mapping each location in an array to a subset based on a defined order and the signalled size dimensions, such that derived data elements from the encoded data set are placed only at locations within the signalled size dimensions.

According to a further aspect of the invention there may be provided an apparatus for encoding information to be compressed into a set of encoded data, comprising a processor configured to carry out the method of the above aspect.

According to a further aspect of the invention there is provided a method of decoding an encoded data set comprising a header and a payload, the payload comprising a plurality of encoded data symbols representing information that has been compressed. The decoder is configured to decode subsets of the payload according to a predetermined decoding process.

The method comprises: decoding the header to derive a set of metadata elements; retrieving from the set of metadata elements, a variation parameter which indicates how the predetermined decoding process should be varied; decoding the payload according to a modified decoding process based on the variation parameter, such that the decoding process is optimised for the plurality of encoded data symbols; and, reconstructing the information that has been compressed from the decoded payload.

Thus a decoding module may obtain a value from a header which indicates that the decoding module should adapt its operations based on the indication and/or implement a decoding process using a variation parameter or shortcut. This solution allows a decoder to optimise its computational efficiency based on the expected content of the data set for example. In addition, the overall size of the data set can be reduced or optimised depending on the application of the decoding process, i.e. how the process it to be applied to information and the desired information to be recreated.

In one embodiment, the variation parameter may indicate multiple subsets of the payload shall be decoded according one or more of the same decoding parameters. Thus individual decoding parameters may not need to be signalled for parts of the payload and the decoder can optimise implementation as checks or variations may not be necessary.

In a particularly advantageous embodiment, the variation parameter may indicate quantization is disabled, such that the plurality of encoded data symbols are not quantized during decoding. In this way, the solution may provide dynamic lossless encoding of an area of a whole data set such as an image. This may be beneficial for regions of interest. Similarly, with the ability to dynamically disable quantization, parameters may not need to be signalled and the quantization steps not performed, reducing data size and computational efficiency.

The payload may comprise a plurality of data structures each comprising metadata and a plurality of encoded data symbols, wherein the metadata may indicate features of the data structure, encoded data symbols or both, and wherein the variation parameter indicates that expected optimisations on the metadata of the optimisation process have not been performed. Such a solution is particularly advantageous when used in combination with other aspects of the disclosure, for example, metadata may be processed efficiently to improve computational efficiency without compromising data overhead.

The predetermined decoding process may expect the payload to comprise a plurality of data structures each comprising metadata and a plurality of encoded data symbols, wherein the metadata may indicate features of the data structure, encoded data symbols or both, and wherein the variation parameter may indicate the data structures comprise only data symbols and do not comprise metadata.

Where there is no metadata, this may reduce the overall data size but the decoding process may be varied to use a predetermined approach to properly decode the data and reconstruct the information that has been compressed.

In an example, a decoder may know that a data tier is being decoded, and may keeps track of tiers in the bytestream, so it may not be given an explicit indication that a tile contains only data leaves not metadata leaves.

This is particularly advantageous when the metadata are node symbols as described in other aspects of the disclosure such that the ordered quadtree is dense.

The variation parameter may indicate groups of subsets of the payload shall be decoded according to the same decoding parameters. For example, groups may be versions or any type of common aspects of the subsets. Such a solution facilitates optimisations on the data to enable faster and more efficient processing according to commonality.

In certain embodiments the variation parameter indicates an expected decoding parameter for the payload is signalled explicitly in the encoded data set and is not signalled by reference. Thus a predetermined or standard parameter can be varied on demand.

Further, the payload may comprise a plurality of subsets, each subset being decoded according to a set of decoding parameters, and wherein the variation parameter may indicate that an indicator element of the encoded data set that indicates which set of decoding parameters shall be used for a subset references a list of tuples of a plurality of lists of tuples, each element of the tuple referencing a parameter to be used from a different set of parameters. Thus the decoding process can be varied according to the types or features of the data to be decoded. Where there is repetition in the information signalled, i.e. parameters, the information that needs to be passed can be reduced by referencing a table or otherwise. Thus, the overall data size is reduced and computational efficiency is improved.

Alternatively or additionally, the payload may comprise a plurality of subsets, each subset being decoded according to a set of decoding parameters, and wherein the variation parameter indicates that an indicator element of the encoded data set that indicates which set of decoding parameters shall be used for a subset is a reference to a set of parameters from a plurality of different sets of parameters. Thus, the decoding process may be informed the parameters are listed in a table rather than having to consult a table to find further pointers to other data sets. This advantageous usage provides optimisation depending on the number and size of the parameters and their frequency.

As can be seen, aspects of the disclosure thus provide a flexible and dynamic way of signalling optimisations and subsequently modifying decoding operations to improve computational speed, efficiency and memory overhead and also to reduce overall data size. Thus, the general advantage provided by the variation parameters is to reduce the amount of data to be encoded/decoded and/or to optimise the execution time at the decoder, for example by optimising processing of the bytestream. This is performed by modifying decoding operations according to a retrieved variation parameter.

According to a further aspect of the invention there may be provided an apparatus for decoding an encoded data set comprising a header and a payload, comprising a processor configured to carry out the method of the above aspect.

According to a further aspect of the invention there may be provided a method of encoding a data set into an encoded data set comprising a header and a payload, the payload comprising a plurality of encoded data symbols representing information to be compressed, wherein a decoder is configured to decode subsets of the payload according to a predetermined decoding process, the method comprising: retrieving a variation parameter which indicates how the predetermined decoding process should be varied; encoding the variation parameter in a set of metadata elements into the header; encoding the information to be compressed into the payload according to an encoding process based on the variation parameter, such that the decoding process is optimised for the plurality of encoded data symbols. The variation parameter may indicate multiple subsets of the payload shall be decoded according one or more of the same decoding parameters. The variation parameter may indicate quantization is disabled, such that the plurality of encoded data symbols are not quantized during decoding. The encoded payload may comprise a plurality of data structures each comprising metadata and a plurality of encoded data symbols, wherein the metadata indicates features of the data structures, encoded data symbols or both, and wherein the variation parameter indicates that expected optimisations on the metadata of the optimisation process have not been performed. The predetermined encoding process may expect the payload to comprise a plurality of data structures each comprising metadata and a plurality of encoded data symbols, wherein the metadata may indicate features of the data structure, encoded data symbols or both, and wherein the variation parameter indicates the encoded data structures comprise only data symbols and do not comprise metadata. The variation parameter may indicate groups of subsets of the payload are encoded according to the same encoding parameters. The variation parameter may indicate an encoding parameter for the payload is signalled explicitly in the encoded data set and is not signalled by reference. The payload may comprise a plurality of subsets, each subset being encoded according to a set of encoding parameters, and wherein the variation parameter indicates that an indicator element of the encoded data set that indicates which set of encoding parameters have been used for a subset references a list of tuples of a plurality of lists of tuples, each element of the tuple referencing a parameter used from a different set of parameters. The payload may comprise a plurality of subsets, each subset being encoded according to a set of encoding parameters, and wherein the variation parameter indicates that an indicator element of the encoded data set that indicates which set of encoding parameters have been used for a subset is a reference to a set of parameters from a plurality of different sets of parameters.

According to a further aspect of the invention there may be provided an apparatus for encoding a data set into an encoded data set comprising a header and a payload, the payload comprising a plurality of encoded data symbols representing information to be compressed, wherein a decoder is configured to decode subsets of the payload according to a predetermined decoding process, the apparatus comprising a processor configured to carry out the method of the above aspect.

According to further aspects of the invention there may be provided computer readable media which when executed by a processor cause the processor to perform any of the methods of the above aspects.

BRIEF DESCRIPTION OF THE DRAWINGS

Examples of systems and methods in accordance with the invention will now be described with reference to the accompanying drawings, in which:

FIGS. 1A-D shows a schematic diagram used to illustrate a technique for separate decoding of subsets of a graph;

FIG. 6 illustrates a root tier bytestream portion;

FIG. 9 illustrates a data tier bytestream portion;

DETAILED DESCRIPTION OF THE INVENTION

Figure 2A:
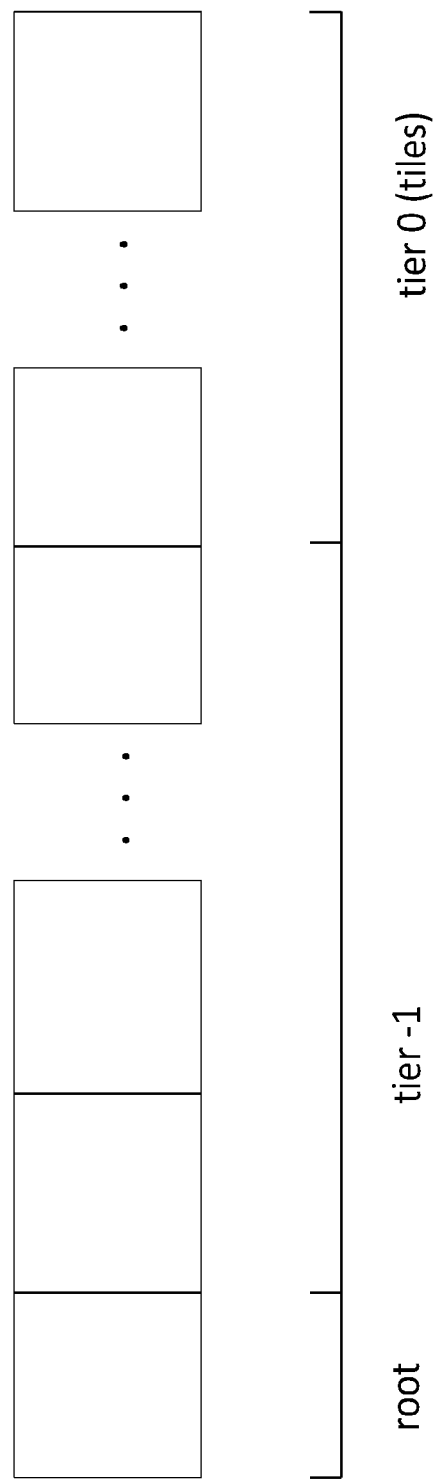
FIGS. 2A-C show a simplified bytestream for transmitting a hierarchical data structure.

The present invention provides a technique and apparatus for encoding, and decoding, data, in particular image and video data. The present invention particularly proposes a technique for hierarchically encoding a sparse plane of image or video into a data stream and recreating the plane from an encoded data stream so that the data stream can be separated into subsets with each subset being decoded separately.

The invention proposes a hierarchical structure comprising tiers. For a tier of a first type, a first type of data element is defined comprising a subset of the set of encoded data; and for a tier of a second type, a second type of data element is defined comprising one or more attributes associated with the first type of data element. The location of the first type of data element in the recreated array is determined from the information contained in the second type of data element.

By defining the data structure required to map the instances of where residual data occurs within a frame of data, it is possible to provide a faster decoding and encoding methodology. In particular the amount of data used to encode the data is sparsified thus reducing the amount of data which needs to be read during decoding. Furthermore, the data, and metadata describing the structure of the data allows for individual portions of the frame to be selectively decoded without reference to other portions of the frame. Thus it is possible to parallelize the decoding process. The technique further reduces the data in memory, for example by allowing data in memory at an instant to be a subset of the data for the whole plane.

The present technique also takes advantage of the sparseness of an array of data to be decoded and/or encoded. That is, the relative amount of zeros in the expected array and the way those zero values are grouped within the array. Similarly the techniques are beneficial where the frequently occurring values are of any predetermined value, instead of zero, but are identical and grouped together.

Typically the data can be of any nature as long as the values can be mapped into an array, although the techniques are also applicable to linear data and most beneficial for image reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream. Residuals are further defined in the present application, but in general residuals refer to a difference between a value of a reference array and an actual array of data.

It should be noted that techniques described in the following description are agnostic as to the meaning or use of the decoded array. Rather the concept of decoding a sparse array from an encoded bytestream is discussed, for example. Of course, the data set may be used to reconstruct a larger dataset by combining multiple decoded data sets. Once recreated the data may represent any information which has been compressed, such as an image or sonogram.

As implied above, the techniques described here relate to the general principle of separately decoding data structures using information contained within a different data structure. An alternative way of considering the techniques described is that the techniques provide for the "breaking-up" or deconstruction of a graph to allow for separate decoding of sections of the graph. That is, an unbroken graph can be broken into a series of graphs or separate data structures which can be separately decoded.

The techniques described herein provide for the benefits that when such broken data structures are sent separately they can be correctly put back together in the graph and further that the total data transmitted can be reduced by implicitly signalling data structures which represent consistent values, e.g. sparse data.

To provide these benefits the technique maps subsets of a datastream onto a data structure, such as a tree. In other words the technique creates a data structure of 'pieces', the data structure storing the spatial information. If the data structure is a tree, the technique could be considered to be a hierarchical 'tree of pieces'.

To illustrate this principle, FIGS. 1A-D is a highly simplified diagram of the concept. FIG. 1A illustrates a set of data. The data is split into data elements ["S1", "S2", "S3"] and consistent areas ["I1", "I2"] which are to be implicitly signalled in the datastream. As above, if the data elements are separately decoded then it is not possible to locate the data elements and there exists no solution to realise the benefits of implicitly signalling data structures so that the data elements of that structure need not be transmitted.

FIG. 1B represents an ordering of the data structures that will be used to map the data to the data structure. That is, the data elements are ordered A, B, C, D, E. FIG. 1C illustrates an example data structure embodying several of the techniques described herein. The data elements are mapped to the data structure in the order shown. Within the data structure there is included a series of attributes that indicate to the decode how to decode the data. In this example, there are a series of flags corresponding to each piece of the data structure that indicate to the decoder whether or not there will exist data elements in the stream for that portion of the data structure or if the data elements are implicitly signalled.

FIG. 1D thus illustrates how a stream could be constructed. The data elements are each included in a defined order. The data structure of FIG. 1C is included in the stream separately to the data elements. The data structure signalled may be only [1, 1, 0, 1, 0] or may optionally also include the order of the elements [A, B, C, D, E]. At the decoder, the received data elements can be separately decoded. By mapping the received data elements to the data structure the data elements can then be spatially located to recreate the original data. The spatial location can be varied by explicitly signalling the ordering in the data structure, that is, the order ABODE can be varied if each transmitted symbol corresponds to a spatial location. The code [1, 1, 0, 1, 0] implies that location C and E of the information is not included in the stream.

Figure 10:
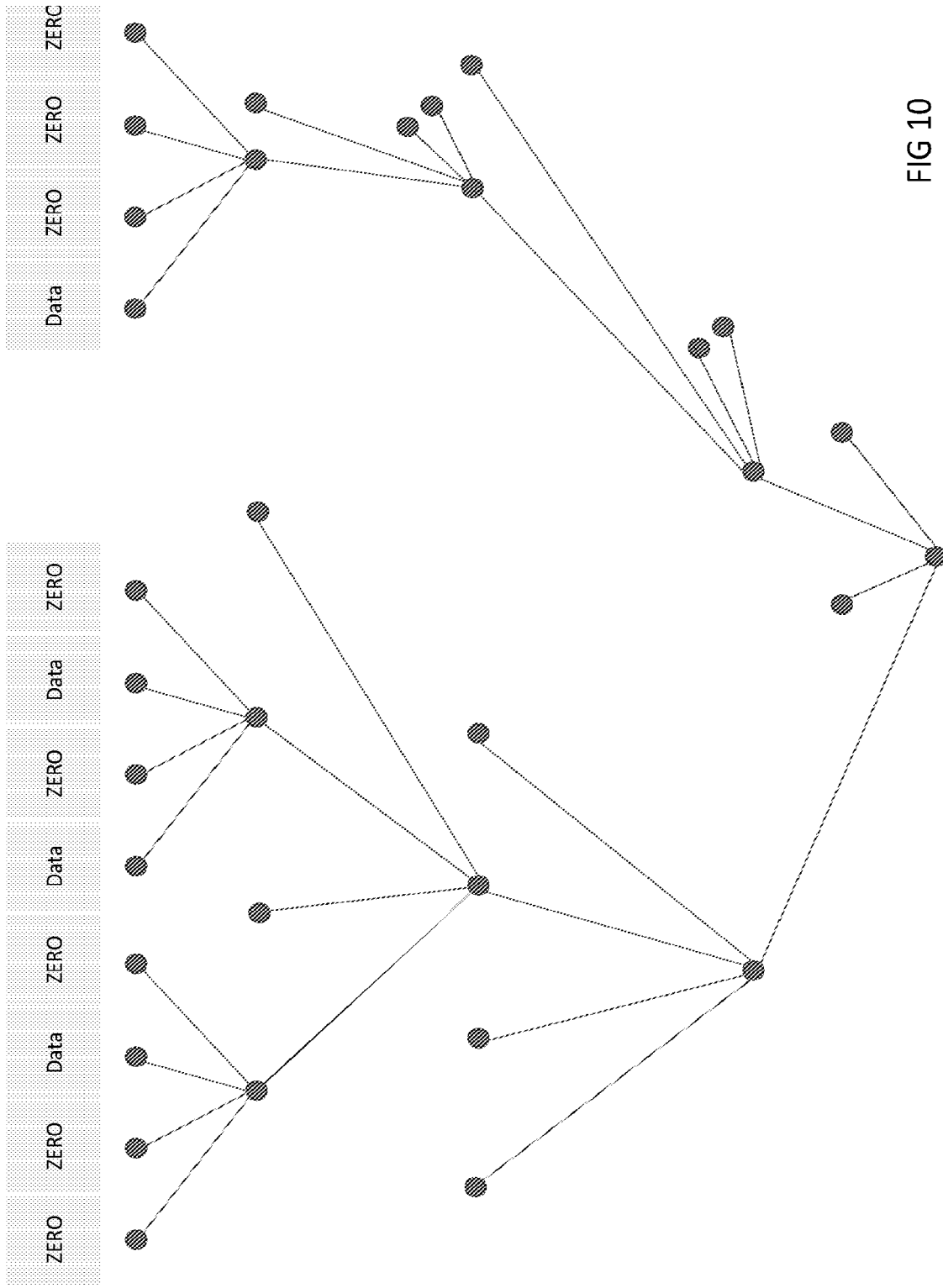
FIG. 10 illustrates a data tier data structure.

Optionally, the data structure could also signal a value which is to replace the areas which are 'void' that is are not included in the stream, i.e. I1 and I2, which we have identified above are at locations C and E. For example, as illustrated in FIG. 10, the value 17 could replace the data element I1 and value 15 could replace I2, which are each located at locations C and E, respectively.

The above overly simplified example demonstrates how a set of data can be split into a series of pieces for separate decoding. To recreate the data, the pieces can be mapped to a data structure to create a data structure of the pieces which stores the spatial information. The process can be recursed for more tiers in the hierarchy. Certain pieces of the data can be signalled implicitly to reduce the volume of the stream.

While it will be clear that the above example is particularly simplified, the high-level principles of the technique have been described. A more detailed example of the techniques will now be described with reference to FIG. 2 onwards.

FIG. 2A illustrates an exemplary representative bytestream or bitstream. These latter terms will be generally used interchangeably throughout the specification. The illustrated bytestream is simplified and representative of an implementation only. The bytestream is divided into a root tier, a first tier and a second tier. The root tier contains attribute metadata relating to the first tier. The first tier contains attribute metadata relating to the second tier. The second tier contains data elements which map to the image to be recreated. As will be understood from the description below the order of the elements is representative only for understanding the technique.

Figure 2C:
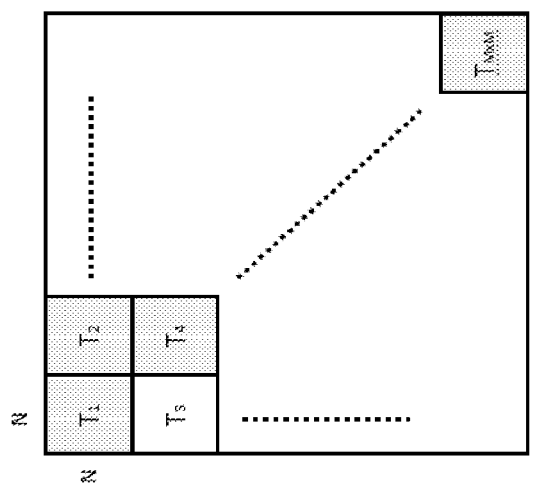
Figure 2B:
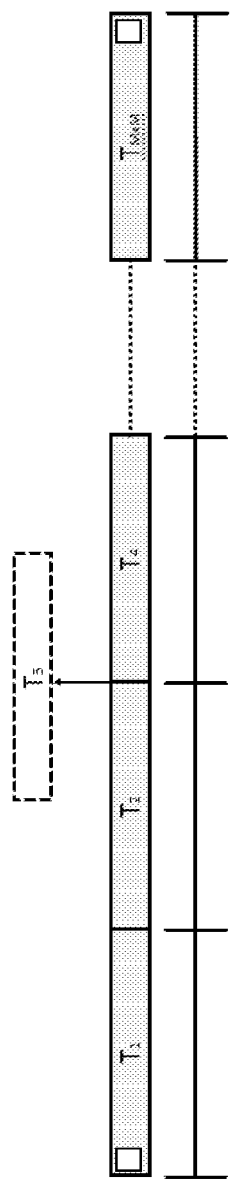

FIG. 2B represents the data structures of the second tier which will herein be referred to as the top tier, data tier, tile tier or tier 0, interchangeably. The bytestream of the data tier comprises a series of data structures, each comprising structure metadata and data elements. The data elements represent the information that has been compressed. As illustrated in FIG. 2B, certain parts of the information may not be included in the bytestream and may be implicitly signalled. The data structures of the data tier each correspond to a block of the array, or tile, as illustrated in FIG. 2C. FIG. 2C shows how each of the blocks map to a region of the array and that certain regions may not be included in the bytestream and instead are implicitly signalled.

Figure 3:
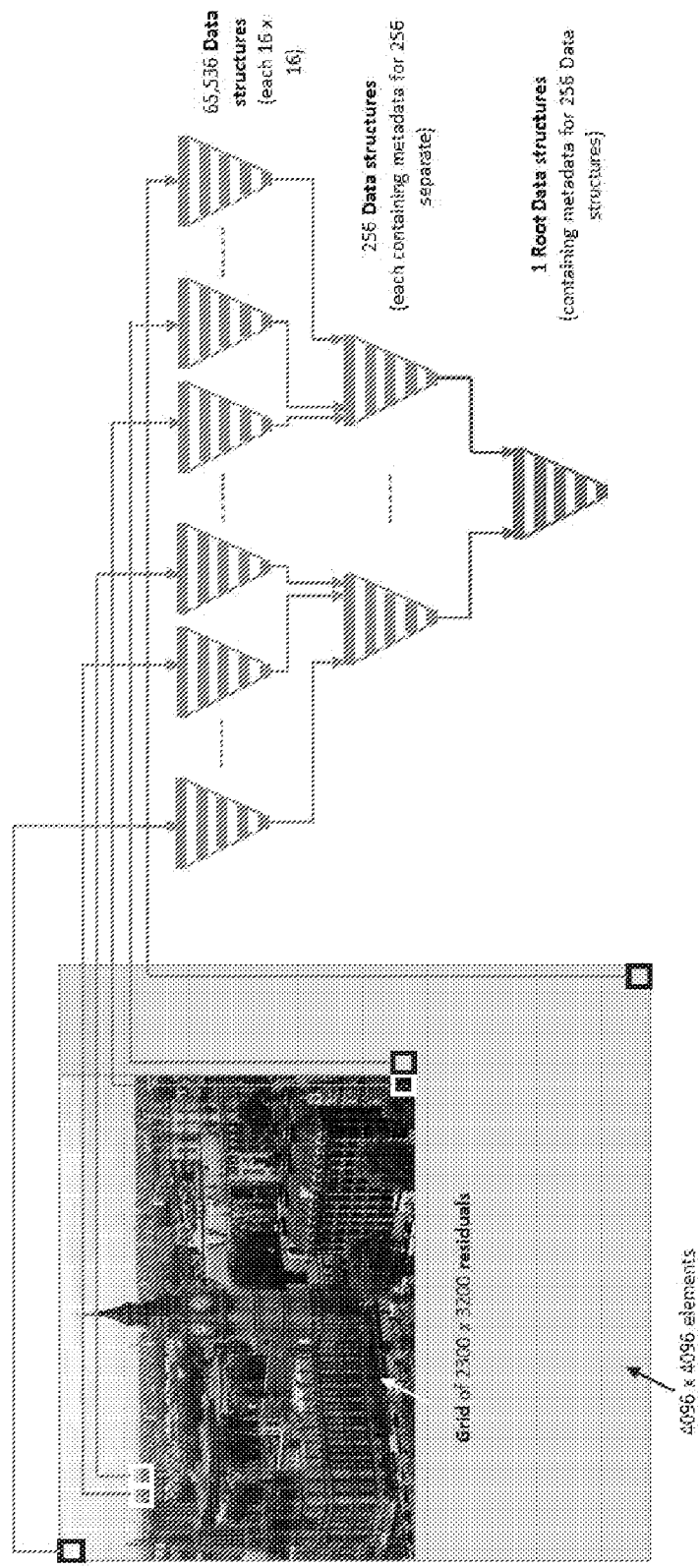
FIG. 3 shows a simplified view of a coding structure mapping to an image plane.

The proposed tiered structure is visualised in FIG. 3 in a bottom-to-top structure. It will be understood that this is merely a visualisation used to aid in understanding the principles of the invention.

The hierarchical structure defines instances of when data is present (and therefore needs to be encoded) and provides a mapping to identify where such data is present. Areas of the frame where no data is present are identified in a manner that reduces the amount of data to be encoded, thus sparsifying the data.

The root tier contains a set of attribute metadata elements which indicate attributes of the subsequent tier. Based on the attributes, the decoder can identify if a data structure is included in the subsequent tier. Each attribute metadata element of the root corresponds to, or describes, a location of a data structure of the subsequent tier, that is, the attribute metadata element may include information about a data structure in the subsequent tier or may indicate that no data structure is included in that predetermined location. A defined mapping of the elements maps to a location in the data structure.

The root tier may optionally be a data structure itself. That is, the data structure may comprise structure metadata which describes the attribute metadata elements. In other words the data elements of the data structure are metadata (or attribute metadata elements) which relate to the subsequent tiers and the data structure comprises metadata (or structure metadata) which describes the metadata (or attribute metadata elements). The root tier may be referred to as a metadata tier. A metadata tier preferably contains metadata but no data, whereas a data tier contains metadata and data.

The root and first tiers each demonstrate similar functionality. That is, the attribute metadata elements of the root tier each describe a data structure of the first tier (or lack thereof) and attribute metadata elements of the first tier each correspond to a data structure of the second tier (or a lack thereof). In other words, each attribute metadata element corresponds to a sub-grid of the overall grid to be decoded. That sub-grid either being represented by an additional tier of metadata elements, a plurality of data structures having data elements or that sub-grid may be void of data. As will become clear, void here refers to an area of the grid having a consistent value.

In the exemplary data structure and technique described, a plane of data is divided into a series of tiles, each having a set of dimensions. Throughout the present description we use the size 16×16 but this may be any size N×N. Depending on the size of the plane to be decoded, only a root metadata tier may be needed. For example, a root data structure storing attributes in a 16×16 array may correspond to 256 data structures in the top tier. If the top, or data, tier contains 256 data structures, each storing a 16×16 array of data symbols, then a 256×256 array can be mapped. As illustrated in FIG. 2, the addition of a first tier provides for the possibility of mapping a 4096×4096 array of data. If the array is a plane of an image, planes of data are suitable to decode UHDTV video streams.

As indicated, each data structure of the data tier corresponds to a section of the array. It is contemplated that each data structure of the data tier may be decoded separately and in parallel. However, the data tier may possibly not be located within the array until the previous tiers have been decoded. Thus the technique provides a combination of serial and parallel processing.

Once the data structures in the data tier are decoded, the data elements of the data structures are optionally each mapped to the array in a predetermined order. A predetermined value is inserted in the information where the attribute metadata elements of the tiers below indicated that there is a void area. That is, when the data structures are arranged as visualised in FIG. 2 the attribute metadata elements of the previous tiers indicate there are no data structures sent in the bytestream for that position of the array. Each attribute of the lower tier describes a data structure (or lack thereof) in a particular location in the immediately higher tier.

The attributes stored in the data structure of the metadata tiers, i.e. the root tier and tiers—k, may comprise one or more of the following, non-exhaustive, list of attribute metadata elements: [0135] a positive or negative flag indicating if a corresponding data structure exists in a subsequent tier; [0136] the dimensions of a corresponding data structure in a subsequent tier; [0137] information to enable the decoder to locate a corresponding data structure in a subsequent tier in the bytestream, such as: lengths of streams; an offset from the current location in the stream; or, a fixed location in the stream; [0138] information to facilitate entropy decoding of a corresponding data structure in the subsequent tier such as indication of parameters to use in a range decoding operation; and, [0139] other parameters or attributes associated with a corresponding data structure in a subsequent tier in the bytestream such as quantization parameters or a predetermined value to be used where no data symbols are included in the data structure.

It is contemplated that each data structure may be any suitable data structure for encapsulating the necessary information and each of these attribute elements may be stored in the data structure in any known manner such as a tuple. For example, the attribute metadata in the root tier may be a relatively simple set of encoded bits, each indicating the attributes of the next tier. Similarly each data structure of the data tier may optionally be a tree to store the necessary data elements or any suitable data structure combination of metadata and data symbols used to encode the information.

The data structure of the top tier may preferably be a sparse quadtree as defined in GB1812407.3, the content of which is incorporated by reference in its entirety. The term sparse quadtree will be used throughout the present invention to refer to a data structure as specified in this document. The structure will be summarised below. The data elements of each N×N tile may be accurately, spatially located within the array when the tile is mapped to the array and the data elements which correspond to the sparse information within each tile may not be included, i.e. signalled implicitly, within the data structure.

Similarly, the data structure of the other tiers may also be a sparse quadtree. In this way, the attribute metadata elements may be the data elements of the top layer of the sparse quadtree which are each associated with (or describe) a data structure of the top tier. Where the sparse quadtree of the root or metadata tiers indicates that no attributes exist in the data structure in the top layer for a particular section of the data structure, optionally, the technique may insert a predetermined attribute that indicates that there is no data structure included for a corresponding part of the data tier. Alternatively, that attribute may be assumed or is implicit, thus signalling that no corresponding data structure is included in the top tier for that part of the array.

Alternatively, each quadtree of the root and first tiers may be a dense quadtree with the quadtree structure being used to locate the attributes in the top layer spatially to generate the higher tier but may not signal information implicitly.

In an implementation, each data structure may thus be an abstract data type, optionally of the sparse quadtree data type.

It will thus be understood that the benefits of the concepts described herein may be realised with any data structure in each tier. Nevertheless for clarity, the preferred implementation of the concepts in which the sparse quadtree is used in all tiers will be described throughout the examples given in the present application.

In the sparse quadtree data structure, once the tree is built, the Top Layer of the tree, or the final layer, may include data symbols. The order in which the data symbols are included in the tree represents the spatial information of an array. The sparse quadtree may retrieve any data element in the Top Layer depending on the tier in which it is used. For example, the sparse quadtree data structure may include a list, tuple, set or integer.

When the sparse quadtree data structure is used for the data tier, the bytestream will include data symbols to recreate an array and in the metadata tiers may include a tuple representing the attributes. As that array is located within the tiered structure defined above, the array is located in a larger array from the tiered structure.

We are illustrating the concepts using a quadtree to recreate a 16×16 array of data and therefore there are four layers and a root in the tree giving 256 possible leaves, each representing a value in the 16×16 grid. Other sized grids may utilise different ordered trees.

The following sets out an example process of decoding an exemplary sparse quadtree data structure. During the process of decoding, an ordered tree is built. Code symbols from the bytestream are converted to decoded symbols and attached to nodes of the tree. The data structure introduces a special symbol which is used by the decoder to build the tree. We refer to this special symbol here as a node symbol. The node symbol indicates to the decoder how to build the tree. Within the node symbol is information which tells the decoder how to map the information from the bytestream to the tree and what it can expect in the bytestream. Using a specific traversal order, the decoder maps the node symbols to the tree and can subsequently map the data received in the bytestream to leaves of the tree in the correct locations. The spatial information or the order of the original information is then contained within the tree. The mapping of the node symbols and traversal leaves blank spaces in the tree which can be simulated or inferred to indicate that a predetermined value was in that location in the original information but was not sent in the bytestream.

The node symbol is a series of binary values or flags that indicate to the decoder if a particular branch in the tree has an expected child where the branch has an expected child if there is a node included in the data set for the Top Layer descendants of that branch. That is, the bytestream contains information on the existence of a child node or not. \Mien the decoder traverses the tree to reach a leaf (a node in the Top Layer), the bytestream contains a series of elements, such as four data symbols or four attribute metadata elements (e.g. a tuple), each representing a value of the leaf of the tree. The tree can be subsequently mapped to a grid using a defined order with each leaf on the tree corresponding to a location in the grid. If the sparse quadtree is a structure in the metadata tier, the attribute metadata element is not mapped to a location in the grid but instead is mapped to the data structure.

Within the bytestream, the node symbols of the data structure are interspersed. That is, the node symbols and data symbols (or attribute elements) occur between or amongst one another within the bytestream. A feature of the data structure is that the decoder cannot know the order of node symbols and data symbols (or attribute elements) prior to the decoding process. Thus there is no set or predetermined ordering to the interspersal of the information. The location of the data symbols (or attribute elements) is deduced from the information contained within the node symbols. The node symbols and data symbols (or attribute elements) may not occur within the bytestream one by one or regularly but rather will be present within the bytestream irregularly and sequentially, but not randomly.

The same traversal is used in the decoding as the encoding to ensure that spatial information is retained. Thus, the sparse quadtree data structure defines the instances and location of the elements. Preferably the tree is traversed according to a depth-first pre-order traversal and, in the data tier, the data symbols are mapped to an array according to a Morton order but any other order may be used provided the encoder and decoder agree. In the metadata tier, the Morton order can be used to associate the attribute metadata elements with the data structures of the subsequent tiers.

Figure 4:
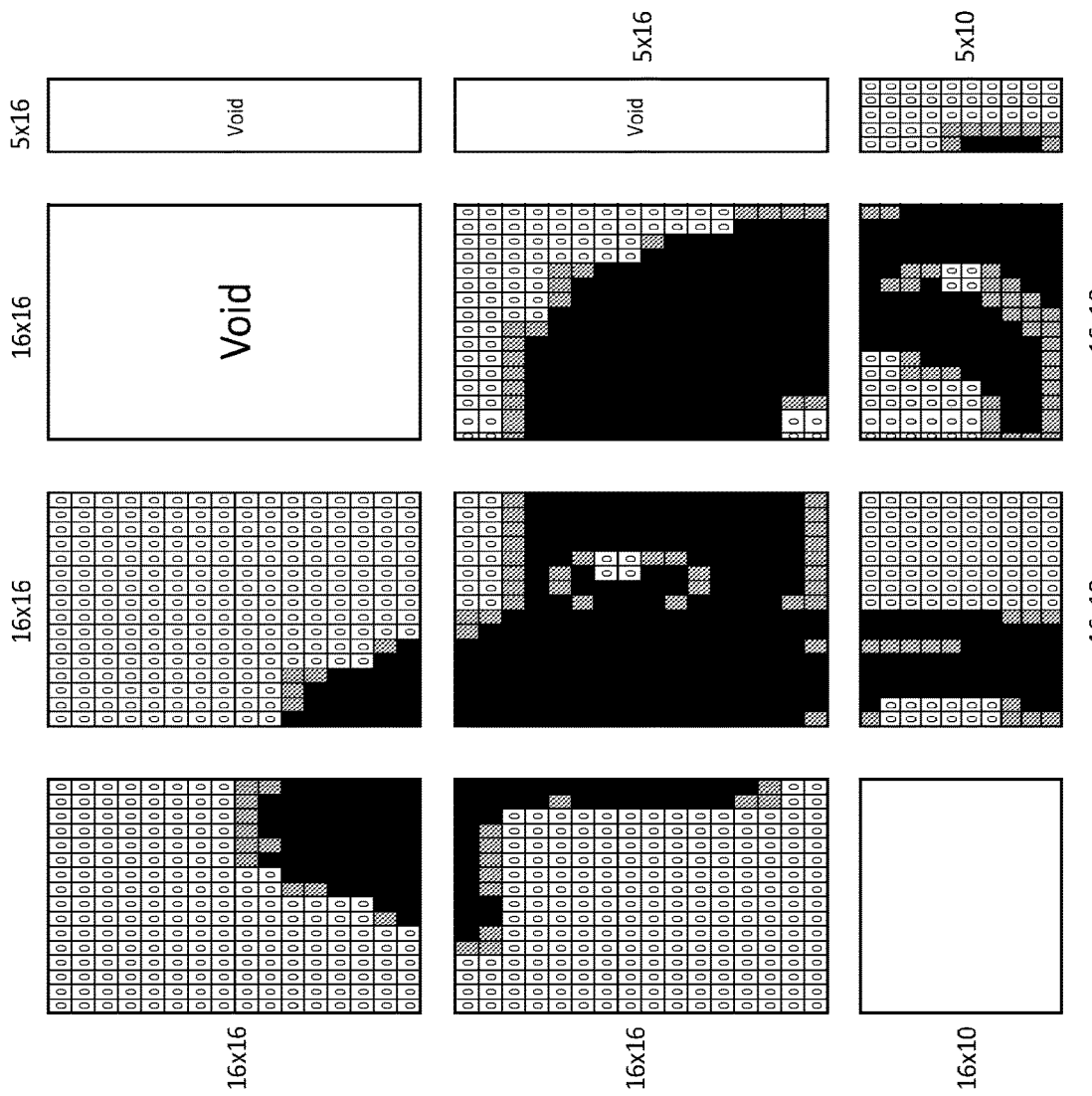
FIG. 4 shows a diagrammatic illustration of an image plane separated into subsets.

FIG. 4 illustrates an image that will be used throughout the present description. The image reflects both the data to be encoded as well as the reconstructed image. It will of course be understood that the image is a simplified plane of data that could represent residual data or component data of an image.

As can be seen, there are four regions of the image that are void of data, that is, are entirely sparse, and eight regions that contain data elements.

In the exemplary data structure and technique described, the plane of data is divided into a series of tiles, each having a set of dimensions. Throughout the present description we use the size 16×16 but this may be any size N×N. In this simplified example, only a root tier and top tier (or data tier) may be included in the bytestream and accordingly we will omit discussion of any intermediate metadata tier (i.e. the first tier described above).

Figure 5:
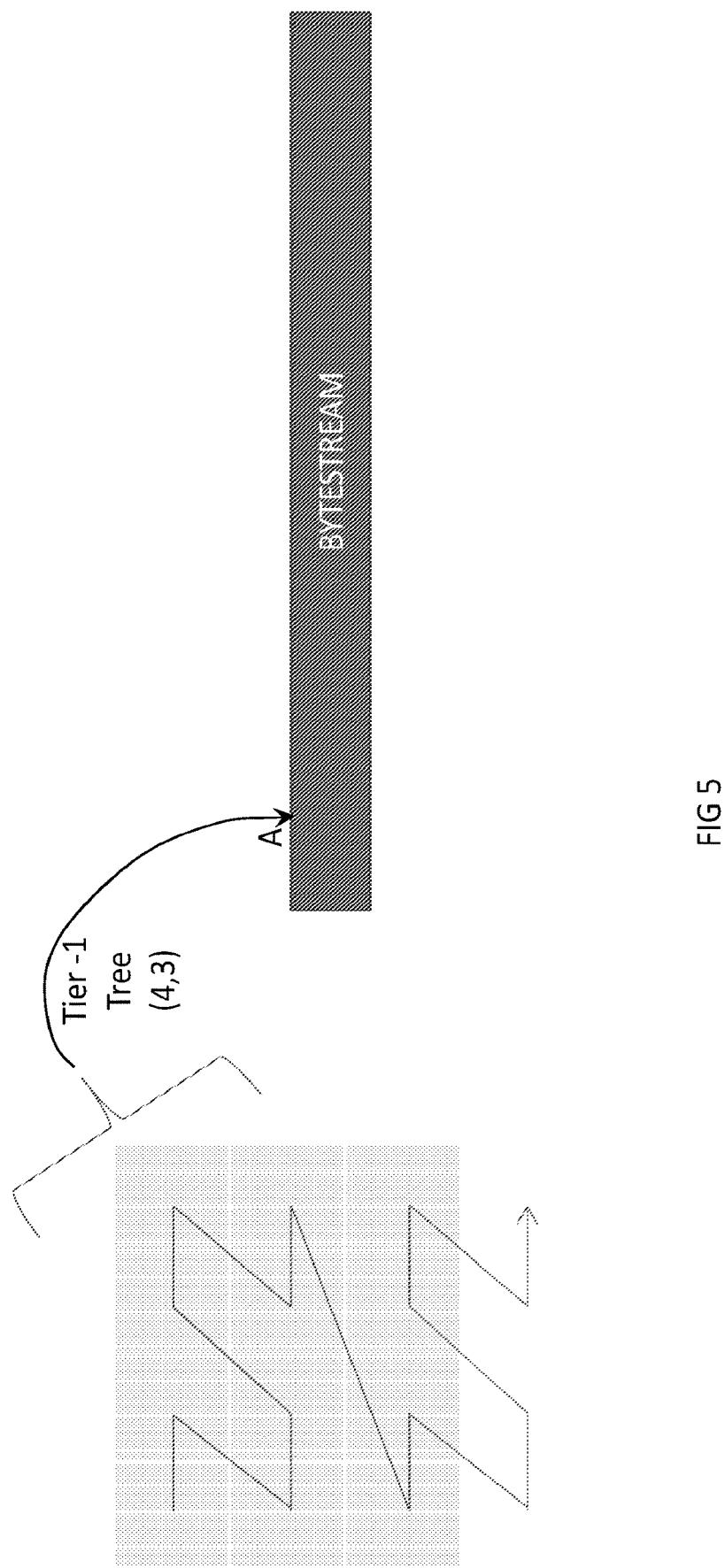
FIG. 5 illustrates a root tier mapped to a bytestream.

FIG. 5 shows schematically the 12 grids that may hold data of the Surface of FIG. 4, where the term Surface represents a plane of data or other large array of data. FIG. 5 also depicts the Bytestream.

First, the start location of the root tier may be signalled in a header of the stream. This may take the form of an offset A from the start of the Bytestream as shown in FIG. 5.

Second, the decoder may start to read a data structure from the stream corresponding to the data structure of the root tier.

The decoder may start to read a data structure with a dimensions tuple (4,3) which contains metadata about all the 12 grids. The dimensions may be signalled separately, either in the header or elsewhere. The concept of dimensions of the grid will be discussed in more detail below. As will be clear from the discussion below, the signalled dimensions may be of the root data structure in which the root data structure then contains the dimensions of the subsequent data structures or may be derived from a signalled dimensions tuple of the plane of data that is encoded in the hierarchical structure.

FIG. 6 illustrates the data structure of this example and shows schematically the structure of the part of the bytestream starting at offset A and describing the root tier. It will be seen that the bytestream comprises three node symbols followed by metadata about data structures that possibly convey actual data. In this diagram, YES stands for metadata that indicates use of the bytestream to convey data and NO stands for a void data structure, absent from the bytestream, since its entire data are implicit zeros.

Some digits of the node symbols in FIG. 6 have been masked with an "x". This is connected with the dimensions of the array (4,3) being smaller than (16,16) which is the dimensions of the quadtree made possible by the sparse quadtree data structure having 4 layers. Masked digits indicate that the corresponding child itself is inactive and automatically has zero children. The values of these masked digits play no role in decoding and can be optimized by an encoder to minimize entropy. Again, further description of the concept of how dimensions are handled will be described below.

In the following description active will mean unmasked and representing data in the compressed information and inactive will mean masked and including optionally transmitted data outside the information to be compressed.

Figure 7:
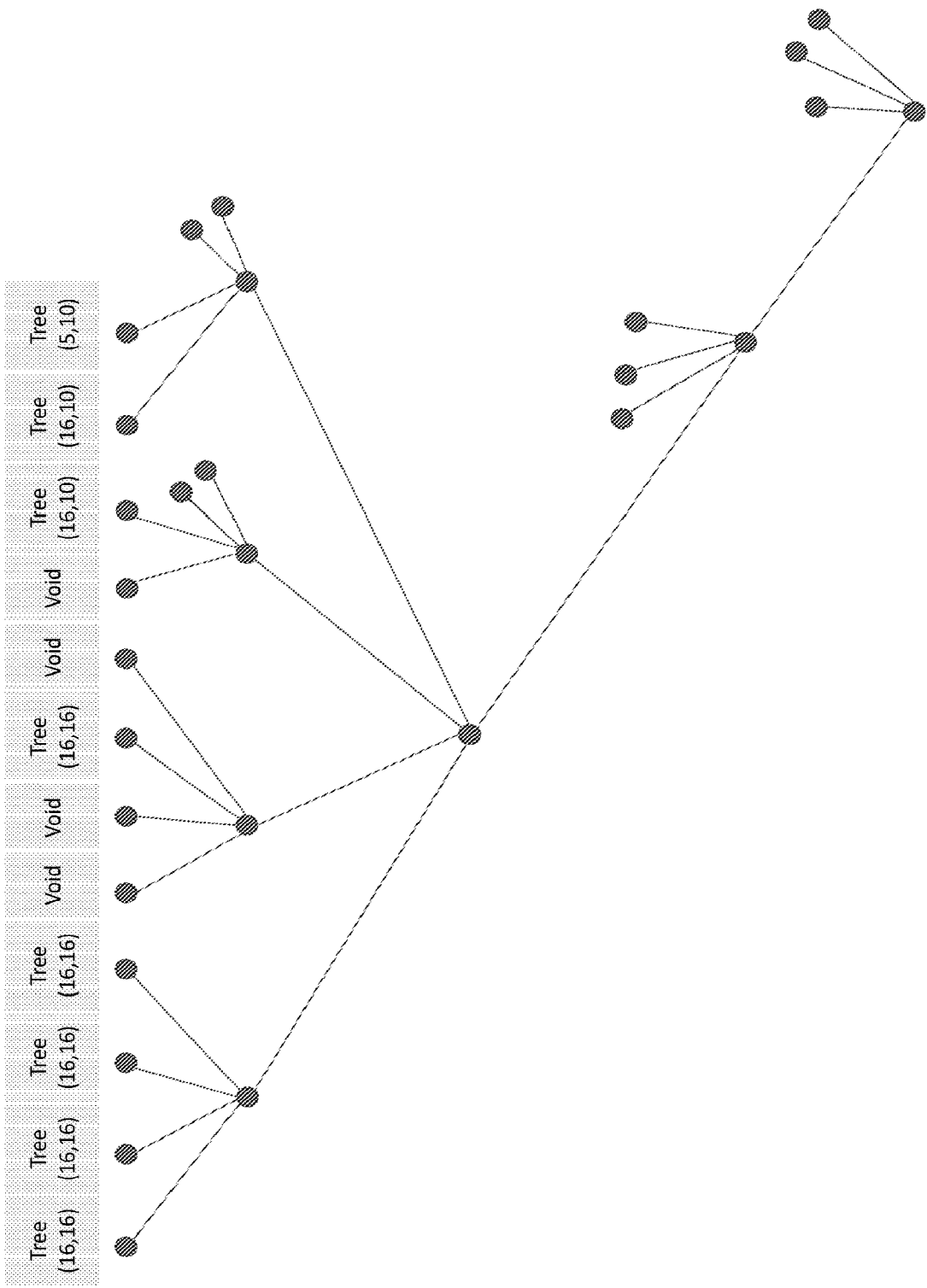
FIG. 7 illustrates a root tier data structure.

FIG. 7 illustrates the process by which the data structure of the root tier is built from the bytestream. The process begins to build a tree and assigns a root node. The node symbol [1xxx] is read from the bytestream. The first flag, 1, indicates that further information for this branch is included in the bytestream. The three masked flags are a result of the other branches of the root node of the data structure being inactive.

The decoder detects inactivity from the signalled dimensions and implements masking by a rule during depth-first discovery. The decoder masks bits in the first node symbol that correspond to inactive children. For an active child, it assigns the appropriate quadrant, every time a new active node is placed.

Following a depth-first pre-order traversal (as pre-agreed with the encoder) the traversal visits to the next node of the tree. Again referring to FIG. 6, we see that the next node symbol is [1xxx]. As with the root node, this gives one active branch and three inactive branches.

The depth-first pre-order traversal then visits the next node. The next node symbol is read from the bytestream which is [1111]. This indicates that there are four branches in this layer of the tree, each having a child and grandchild node.

In the data structure of a sparse quadtree, the next layer of the tree is optional. The node symbols that correspond to the penultimate layer in the tree are not sent but rather are implicitly assumed by the decoder. It will be understood that the node symbols in this layer would be understood to include a set of positive flags (or [1111]). Another way of looking at this implicit signalling feature is that a node symbol is sent or included within the bytestream only if a grandchild node exists for the visited node of the tree. In other words, a node symbol shall have a grandchild node.

Accordingly, the decoder knows that the next symbol to be expected from the bytestream is an attribute metadata element representing an attribute of a data structure of the subsequent tier, as it has reached the top layer of the tree following the depth-first pre-order traversal.

Since we are in the root tier, the decoder retrieves the attribute metadata element (for example a tuple of attributes) from the bytestream and associates the element with the node in the top layer. Following the depth-first pre-order traversal and the implicitly signalled penultimate layer, the next three elements to be decoded from the bytestream will also be attribute(s) of the data structures in the subsequent tier.

Descending the tree the decoder will see that the node symbol was [1111] indicating that the next branch is active and there are data symbols in the bytestream for this branch. The decoder ascends the tree until the Top Layer is reached. Here again, the next four attributes will be retrieved from the bytestream and associated with the next four nodes of the tree.

Descending the tree the decoder will see that the node symbol was [1111] indicating that there are data symbols in the bytestream for this branch. However, the signalled dimensions imply that only two of the branches of the penultimate layer are active. Accordingly, the decoder will retrieve only two attributes from the bytestream.

Again, descending the tree the decoder will see that the node symbol was [1111] indicating that the next branch is active. However, the signalled dimensions imply that only two of the branches of the penultimate layer are active.

Accordingly, the decoder will retrieve only two attributes from the bytestream. This section of the top layer has now been filled.

Following the depth-first pre-order traversal, the decoder descends to Layer-3. Since this layer only indicates one branch and this branch has already been visited, the process of building the ordered tree will end as all nodes have been visited and populated.

FIG. 7 shows 10 inactive nodes (on dashed branches). During discovery of the tree's topology, metadata as well as node symbols were encountered. This information (or attributes) about other data structures is passed through as elements which are depicted (unchanged from FIG. 5) above certain top layer nodes of the tree.

Figure 8:
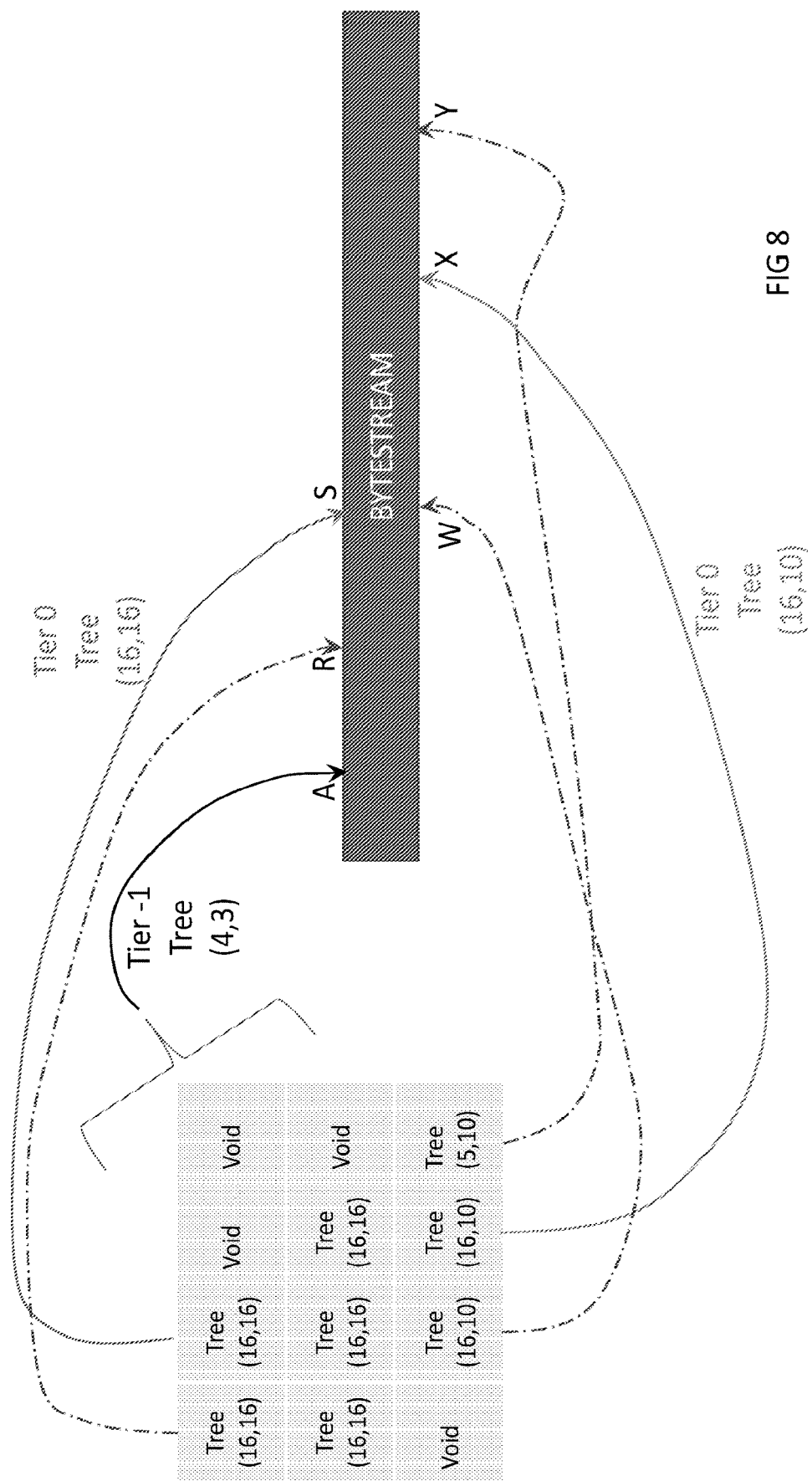
FIG. 8 illustrates attribute metadata elements mapped to bytestream.

These elements are now allocated to a 3×4 pattern as shown in FIG. 8. The scan order is called Morton order and is illustrated in FIG. 5. Note that four vertices on the path shown in FIG. 5 are inactive. This is reflected in FIG. 7 by the corresponding inactive nodes in the Top Layer of the tree.

The values in the stream shall be interleaved in the example in depth-first order. In the example, the data of the tree is mapped in a Morton ordering. A Morton ordering maps multidimensional data to one dimension while preserving locality of the data points. It was introduced in 1966 by G. M. Morton. The terms Z-order, Lebesgue curve, Morton order or Morton code are used in the art.

Morton ordering is well known in the art and will be understood. It will also be understood that any suitable mapping of the data from the tree into the grid may be utilised.

In practice Morton ordering using 2×2 blocks means that the symbols of the tree are mapped to the grid in the following example order for an 8×8 grid:

TABLE-US-00001 0 1 4 5 16 17 20 21 2 3 6 7 18 19 22 23 8 9 12 13 24 25 28 29 10 11 14 15 26 27 30 31 32 33 36 37 48 49 52 53 34 35 38 39 50 51 54 55 40 41 44 45 56 57 60 61 42 43 46 47 58 59 62 63

When considering the mapping of the tree to the pattern, it can be considered that the z-order mapping results in each branch of the tree being a quadrant of the overall array.

While a Morton ordering is a preferred ordering, it is also contemplated that other orders such as a Hilbert space-filling curve, also known as a Hilbert pattern or Hilbert curve, may be used which may provide implementation or efficiency gains depending on the array to be compressed and the likely locations of non-zero elements in the array. In certain circumstances the Hilbert curve ordering will also have better locality preserving behaviour.

FIG. 8 illustrates how the pattern of attributes mapped from the root tier corresponds to data structures received in the bytestream and the order in which the data structures are received in the bytestream.

At this stage of the process, the decoder knows the order of each of the data structures of the top tier in the bytestream. The decoder knows where there are void areas of the array where no data structures are included in the bytestream and accordingly knows how to arrange the data elements of the data structures once the data structures have been decoded.

Accordingly, each of the data structures in the data tier can now be decoded and their encoded data added to the array.

The bytestream from position Y of FIG. 8 is shown in FIG. 9 as an example of the final Tier. It can be decoded using the same depth-first discovery technique already discussed. In this example, the five node symbols appear in two places within the sparse quadtree and bytestream.

In decoding this data structure, the decoder follows the sparse quadtree decoding technique. The reader will be reminded that while it is described that the data structures of this tier are sparse quadtrees, the data structures may be any suitable data structure suitable for spatially locating data elements within in an array. From the decoding process above, we know where the data of this data structure will be stored in the wider array.

The sparse quadtree data structure of this example stores a 16×16 array of data and accordingly includes five layers: a data or top layer, layer-1, layer-2, layer-3 and a root layer.

FIG. 10 illustrates the final tree once the data structure has been decoded. To get from the bytestream of FIG. 9 to the tree and located data of FIG. 10, the decoder follows the depth-first pre-order traversal as is predetermined.

The first node symbol is retrieved and masked as the dimensions of the array are known so that the second and fourth elements of the node symbol lead to inactive branches. The retrieved node symbol is [1x1x]. This results in two active branches from the root. The next node symbol is retrieved which is [0010]. Accordingly, since the first element is a 0, the tree traversal ends for that branch. The traversal continues for each sibling as the third element of the symbol is a positive flag. Another node symbol is retrieved and associated with the child node in layer-2 connected by the third branch from the layer-1 node. The node symbol retrieved is [1010]. Since a node associated with a node symbol must have a grandchild node, the branches from layer-2 and the nodes of layer-1 can now be populated. It can be seen that there the first and third branches are present (i.e. "are not cul-de-sacs", "are progressive", "are not final" or "are not dangling"), the second and fourth branches do not have child nodes. The first and third branches lead to child nodes, each of which have four child nodes.

Following the depth-first pre-order traversal, the decoder has reached the top or outer layer. The decoder now retrieves four data symbols from the bytestream: {0, 0, Data, 0}.

The decoder descends to visit the node in layer-2 where the associated node symbol indicates that the second branch has no children. The third branch is leads to a child node and since we are in layer-1 the node can be associated with a predetermined node symbol of [1111]. Four more data symbols can be retrieved and associated the nodes in the top layer in the retrieved order.

From the associated node symbols and the traversal order, the decoder can now descend to the root as the node symbols in this section of the tree have all indicated that there is no data in the sections of the array.

Since the second branch of the root node is inactive, the traversal visits the child node of the third branch, retrieves the node symbol [10xx], follows the traversal order, retrieves the node symbol [10xx] and reaches the top layer. Four more data symbols can be retrieved and associated the nodes in the top layer in the retrieved order. There are no nodes in this section of the array which are indicated as having children. Since the fourth branch of the root is inactive and so the process can end as the tree has been populated and all data retrieved.

Figure 11:
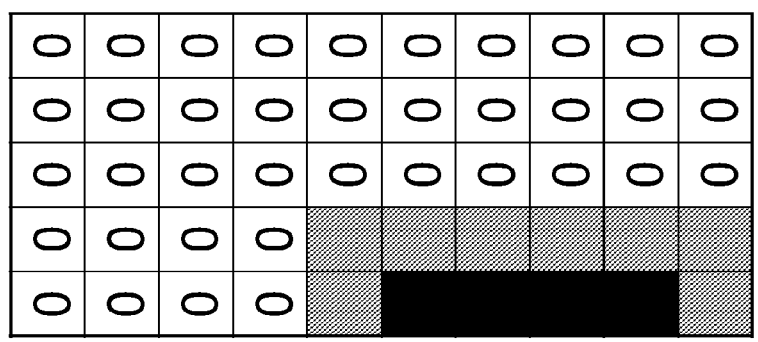
FIG. 11 illustrates recreated information.

We now have data which can be mapped to the array as shown in FIG. 11. Whether the grid is populated as the tree is populated or after is unimportant. As above, the tree can be mapped using spatial information inherent to the data structure. In practice, the process may wait until the entire tree is populated.

Using the Morton Order, the information of the tree structure can populate the grid. Since the tree of FIG. 10 illustrated that there was a sparse area in the first quadrant, the decoder can simulate that the leaves of this node are sparse in Layer 0. The zero symbols can be mapped to the grid according to the z-order mapping. In practice, the simulation may be done in one single step for each of the Layers (e.g., all the nodes associated with the zero node symbols in that Layer are simulated simultaneously and the corresponding zeros are mapped in the grid). The simulation can be a notional process, i.e. done implicitly rather than explicitly.

FIG. 11 shows silhouettes with hatched elements in some areas. These hatched elements are the same as in the original Surface (zeros) but they have been decoded from the Bytestream, rather than being implicit. They come from the nodes labelled ZERO in FIG. 9 and are not capable of sparsification, which acts on larger square regions. As is optional in the sparse quadtree data structure, all data symbols for the top layer are sent, even if they are zero value (or the same value as the predetermined value implicitly encoded).

Returning to FIG. 4, this figure shows the reconstruction of all the Tiles into a decoded image of a horse. The array of FIG. 9 is shown bottom right. It will be recalled from the Morton Order of illustrated in the path of FIG. 4 that this is the bottom right and is included last in the bytestream, starting from position Y of the bytestream shown in FIG. 8. For brevity we have not described in detail the content of the bytestream between the end of the root tier at position R to the beginning of the final data structure at position Y. The content of these can be deduced from the horse image and from following the process describes above.

As mentioned above, the dimensions of the array to be populated may be signalled separately to the decoder. Together with the starting location of the root tier, the decoder is able to decode the data elements and place them in the array. The dimensions form part of a concept described here as Active Volume and will be described in the concept of FIGS. 12 and 13.

Figure 12:
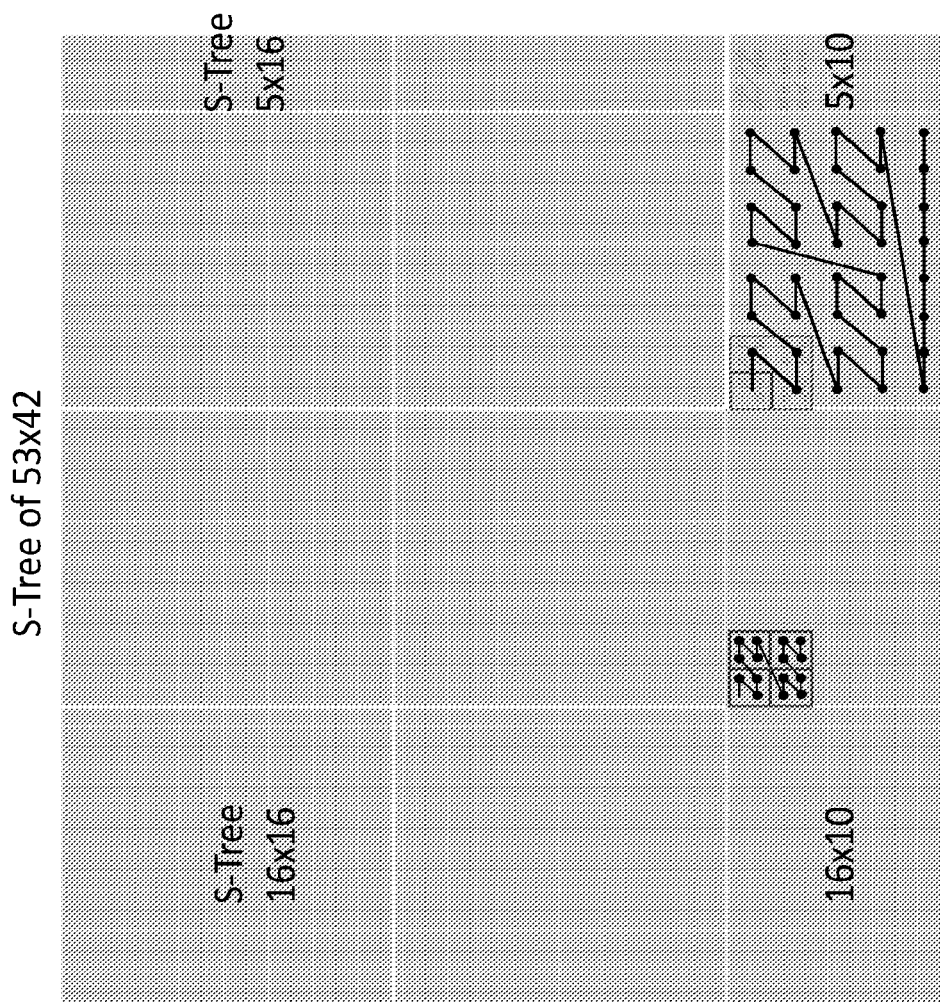
FIG. 12 illustrates a plane of data having non-square dimensions.

In the example decoding process, the principles allowing decoding of a single surface of dimensions 53 wide by 42 high are discussed. A surface refers to the array of data to be recreated. The tiered hierarchy of data structures is a generic structure whose dimension is indicated by a dimensions tuple and it has a number of Layers. The decoder is expected to know in advance the relevant dimensions tuple, here (53,42). Hence the surface is initially split into a pattern of 16×16 and smaller gilds, with the smaller gilds in the right hand and bottom columns, as shown in FIG. 12. The data for the smaller grids is, where necessary, conveyed with Tiles, referred to here as data structures in the top tier. From the signalled dimensions, the decoder can calculate the number of 16×16 blocks to be included and the dimensions of the outer grids to make up the total dimensions. For the 53×42 array, the dimensions necessary in the outer grids are shown in FIG. 11, for example, to make up the height of 42, two 16×16 grids are needed with a height of 10 for the bottom grids.

From the dimensions the decoder is able to determine the amount of metadata tiers needed to signal the attributes of the data structures of the data tier. For example, in the 53×42 example only a root tier and data tier are needed.

Figure 13:
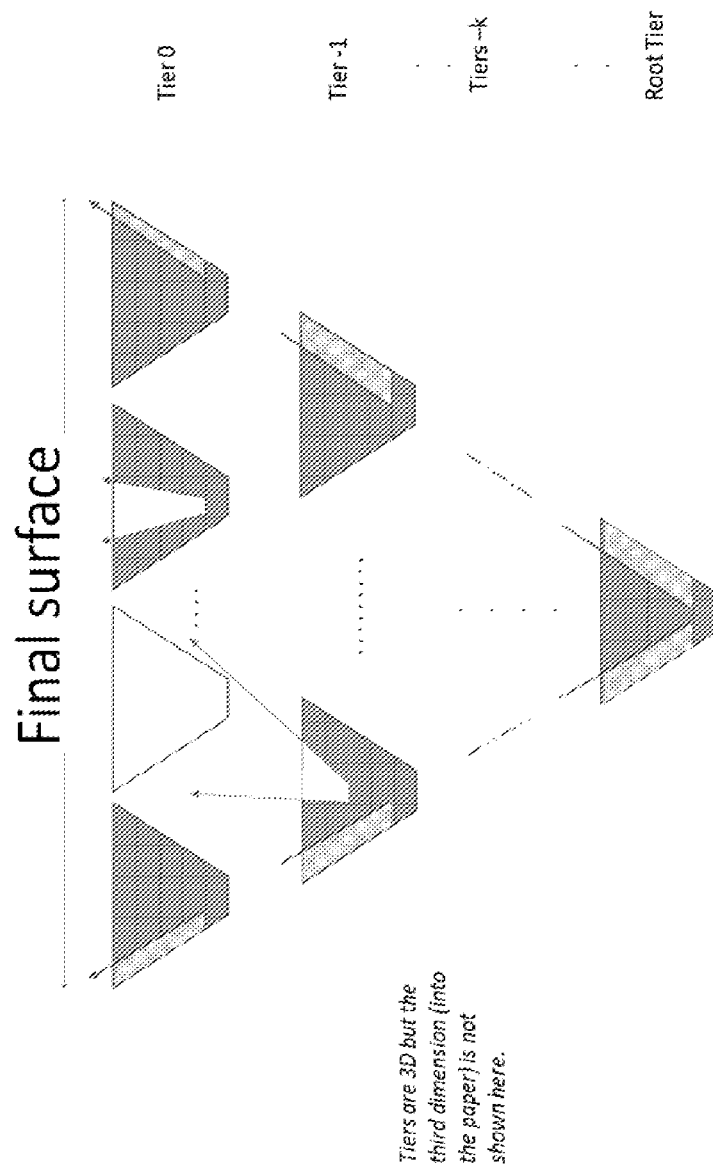
FIG. 13 illustrates a hierarchical data structure of a plane of data having non-square dimensions; and, FIG. 14 illustrates a grafted graph.

When decoding each of the non-square data structures, the decoder can calculate knows the dimensions of that particular data structure. As mentioned above, when decoding the data structures in each tier, where a node symbol may correspond to a data element or region of the surface that is outside the region that includes an image, the decoder will mask each bit. This means that the decoder will ignore the information included within that element of the symbol. Schematically this principle is illustrated in FIG. 13 which illustrates the hierarchical structure described. The hatched areas represent where there are inactive regions of the structure. The blank area represents where the area in the surface is void. The tiers may be any dimensions and in this example are three dimensions but the third dimension into the paper is not shown.

At each stage of regenerating the plane, it is contemplated that each of the data structures between tiers may be grafted together. This grafting process is contemplated for when all data structures are sparse quadtrees. The grafting process is equivalent to the replacement of a leaf of a lower tier with the root of a tree of a higher tier.

Figure 14:
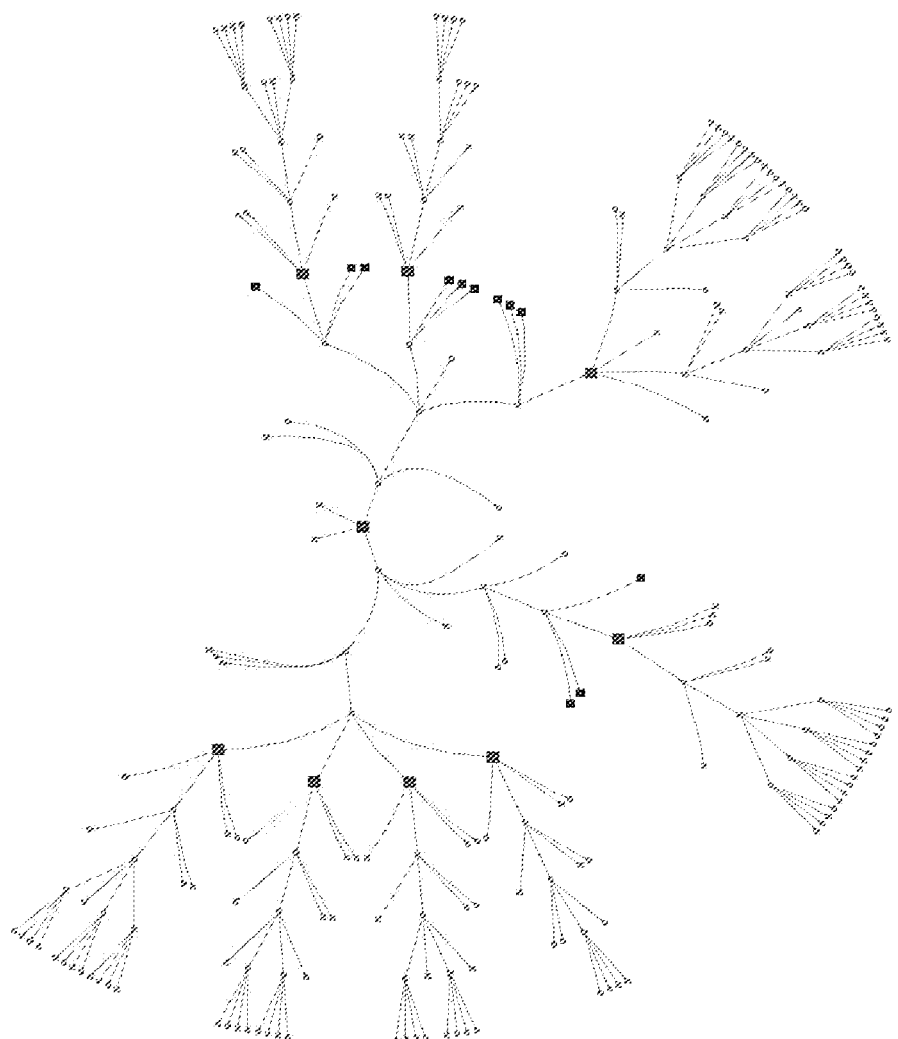

FIG. 14 illustrates a graph structure of a grafted tree. The root node and the tree of the root tier extend outward toward their leaves which are either connective nodes or terminal nodes, that is, the glue nodes of the original tree. The trees of the data tier are glued to the nodes of the root tree and then extend outward toward the outside of the graph.

The assembly of a tree shall be carried out in order of tier, from lowest to highest. Attaching all the data structures of the next Tier, to a partly regenerated tree, shall be called grafting a tier. Once a tree has been partly regenerated by grafting tiers from the root tier data structure up to and including metadata tier-n, the data structure of tier-n+1 shall be decoded. When all the relevant data structures have been decoded, they should together be grafted to the tree to give it an extra 4 Layers.

The active volume of the intended final tree (root data structure to tier 0) shall be known from the start, since it is a property of the surface. Similarly, the rise of the final tree, which we shall call R, shall be known. Prior to decoding the tier-n+1 data structure of a tree of Rise R, a complete tree of Rise R−4*t shall already be known (for example, prior to decoding Tier 0, a complete tree of Rise R−4 shall already be known.)

In order to decode each data structure in parallel, the start location of each data structure to be decoded may preferably need to be known. In certain embodiments, the data structures of the top tier may be of a fixed length so that the decoder may predict the locations of each structure. Alternatively, the start locations of each structure may be separately signalled. In preferred embodiments the attributes of each data element included in the lower tiers indicate to the decoder how to decode the corresponding data structure. For example, the attribute may include the start location of the data structure within the stream and also may indicate that the data structure is not included at all, as was explained above. The attribute may accordingly be a 0 value if the corresponding data structure is not included in the stream and may be a positive value indicating the start of the data structure. The start location may also be signalled using an offset value from a current location in the stream or from the start of another block. Similarly the attribute may contain the length of the corresponding or associated/indicated block so that start locations for any data structure can be inferred by summing the lengths of other blocks. In this latter case, the data structure of the previous tier may need to be decoded to infer the locations of the later data structures from the lengths of the other structures in the tier. Thus, the technique provides a combination of serial and parallel processing. Where there are multiple tiers, the length, start location or an offset value may be signalled in a header.

Techniques of the present invention provide particular utility where a process can be optimised based on the information encoded by the bytestream such as Level of Quality, Residuals, Directions, or a Plane of data, etc. as will be understood from other patent applications such as WO 2013/171173 referred to above.

Separate decoding as described herein allows for a generic function block to be provided on an FPGA which will justify its real estate by being suitable for decoding any data structure, i.e. a Tile, Tableau or any Tessara as described herein. The re-use of similar or identical function blocks is particularly advantageous to improve decoding optimisation. The decoding of each data structure can be replicated and repeated.

In preferred embodiments the attributes may include information to facilitate entropy decoding of a corresponding data structure in the subsequent tier. For example, the bytestream may be divided into codes which are then encoded and decoded using a Huffman encoding and decoding operation. Alternatively, the stream of symbols may be encoded and decoded using an arithmetic coding operation, such as a range encoding and decoding operation. These and other similar entropy coding techniques are well known in the art.

Entropy coding is a type of lossless coding to compress digital data by representing frequently occurring patterns with few bits and rarely occurring patterns with many bits. In broad terms, entropy coding techniques take an input codeword and output a variable-length codeword using the probability of the input codeword occurring in the data set. Therefore, the most common symbols use the shortest codes. The probability information is typically stored in metadata used by the decoder to recreate the input information from the output codeword.

The attributes may include probability information directly or may alternatively, and preferably, indicate to the decoder which of a set of probability information should be used to decode that particular data structure referenced by the attribute. The probability information may be stored in the decoder or may be signalled separately in the bytestream.

An entropy decoding operation may retrieve metadata from a store of metadata corresponding to the attribute signalled. The metadata may include decoding parameters for example and may include an indication of probability. For example if the decoding operation is a range decoder, the metadata may include a probability distribution or cumulative distribution function.

In an implementation, one entropy decoding operation may sequentially decode the data structures or multiple entropy decoding operations or modules may be used. In practice, each data structure may be decoded using a different type of entropy decoding for example, the attributes may indicate that a data structure is encoded using Huffman encoding and a separate data structure is encoded using arithmetic encoding. Preferably though, a range decoder is used with the attributes indicating to the range decoding module used to decode the data structure, which set of metadata should be used to decode that data structure.

It has been described above how attributes of a later data structure may be signalled in the bytestream. Specifically, it is described that a hierarchical data structure may be provided. The following describes how a decoding module may obtain a value from a bytestream or data set and determine based on this value a type of shortcut used in the encoding process and/or to be used in the decoding process. The decoding module may configure the decoding process to adapt its operations based on the indicated shortcut and/or implement a decoding process which was the indicated shortcut. The specific types of shortcuts, what each type means and what advantages it provides may be described below.

In certain examples, the value may be included in a header of a bytestream and may indicate one or more modifying operations used in the encoding process when building a header and/or to be used in the decoding process in order to decode a bytestream. These modifying operations, or shortcuts, provide many general advantages such as to reduce the amount of data to be encoded/decoded and/or to optimise the execution time at the decoder, for example by optimising the processing of the bytestream.

The terminology used herein may describe these shortcuts as transformation rules, variation parameters or adaptation parameters which indicate modifying operations or a modified decoding process or decoding module to be used. Such terminology may be used interchangeably to refer to similar functionality.

In certain examples, the decision to implement these operations may be a rate-control decision.

As noted above, the shortcut may be implemented as a string of bits in a header of a bytestream or bitstream. Thus, depending on the configuration of the header and payload, the modifying operator may be applied to the whole of a plane of data, multiple planes or to a particular level of quality (LOQ) or set of data. It is of course contemplated that the shortcut value may be signalled in any other suitable means to modify operation of the decoding module. If a later header or a later part of the header contains metadata that is indicated as not being needed for example, that part of the header or secondary header may be void, empty or not sent. Thus, it can be said in this example and other examples that the shortcut of a header varies a later part of the header or a secondary header.

The choice of shortcut may for example be constant for a version of a plane and the shortcut is fixed. For a new plane or version of a plane, one can change the shortcut.

When encoding a plane, the encoder can consider which modifying operation or option will be more beneficial. For example, an extra table will take up space in the stream but can save overall space. If there are 1000 tuples all having a number 5 or less then a list may need to be 5 long but supplies an attribute to a 1000 different subsets. In this way, the shortcut can indicate how the data is set or retrieved at the decoder.

In a particular example, this concept may have particular utility with other aspects of the present disclosure. For example, in certain embodiments the shortcuts control which attributes are associated with the data structures. Similarly, the shortcuts can indicate which implementation option is shown from a plurality of implementation options.

Examples of several possible shortcuts will now be described.

In one example, the shortcut may indicate that where there is a list of attributes, a single index value may indicate which of a set of attributes are to be used for each subset. That is, where a tableau data structure or root data structure indicates the attributes of a later data structure, an index value may point to a set of attributes to be used.

Alternatively, the index value may instead point to a set of further indices. The shortcut may indicate which of these options is to be used.

In a specific example, an index of 33 in the data structure may indicate that a later data structure should be decoded according to a set of attributes pointed to by 33 in a list. A different shortcut may indicate that instead 33 points to a list of tuples e.g. {43, 18, 5}, i.e. row 43 in list A, row 18 in list B and row 5 in list B. Thus, the shortcut can optimist the communication of index values to the decoder from the encoder and the speed of decoding the data, together with data overhead.

Of course it will be understood that these attributes and tuples may be stored in a data store or signalled in the bytestream or bitstream.

In a further example, a shortcut may indicate that an index is not sent or an attribute is not indicated in the data structures. That is, the shortcut may indicate that some data structures are decoded according to different attributes and some do not. In a detailed implementation of this example, data structures of a different plane are not allowed to have different attributes but between planes they can be different, possibly without those being signalled in the header. This can be summarised as an intra-plane or inter-plane difference.

In an additional shortcut example, the shortcut may indicate to the decoder that no node signals are sent. For example, in the decoding process described above, all node signals can be assumed to be [1111] and thus cost nothing to send. The data structure may only contain data elements but these can be spatially located using the predetermined mapping orders described above. In sum, all quadtrees may be dense, but the symbols are not sent to reduce overhead.

In a particularly advantageous example of a shortcut, the encoder may indicate to the decoder that no quantization parameters are sent and quantization has not occurred. Thus the decoder may not implement quantization for the data structure. This provides for selective lossless encoding. In sum, the shortcut may indicate that quantization is disabled.

Similarly, a shortcut may indicate a particular transformation should be performed on a block.

Thus it can be seen how a shortcut value or variation parameter can be used by the decoder to vary a decoding operation or utilise a different decoding operation to optimise decoding of a set of data.

It will be clear to one skilled in the art how techniques described herein may be embodied within a system comprising an encoder and a decoder. At the decoder, the encoded data set may be retrieved from a data store or received from a streaming server. In such a further embodiment, one or more streaming server(s) may be connected to a plurality of client devices. At the streaming server, the encoder may receive and encode a video or image stream and deliver the stream (e.g. bytestream or bitstream) to the client devices. Thus the stream can be decoded by a decoder to recreate the information that has been comprised. Any suitable mechanism to deliver the stream may be used, such as unicast or multicast, as would be well-known to the skilled person.

Techniques described here may be suitable for the encoding, decoding and reconstruction of any dimension array of data. However, although the techniques are also applicable to linear data, they are most beneficial for image or video reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream or bitstream. Residuals are further defined in the present application, but in general residuals refer to a difference between a value of a reference array and an actual array of data. Thus, the techniques are most suitable for any plane of data.

It should be noted that techniques described in the following examples are agnostic as to the meaning or use of the decoded array. Of course, the data set may be used to reconstruct a larger dataset by combining multiple decoded data sets. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

A technique for decoding a bytestream will now be described.

A decoding module would receive a portion of data to be decoded (e.g., Stream). This portion of data would be part of a data stream, such as a Bytestream or Bitstream. This portion of data may be of variable length (for example, 3 bytes or equivalently 24 bits) and is typically associated with an elementary data structure that describes the data to be decoded, for example the data structure called Tile as further described in the present application and other applications by the same applicant such as European patent application No. 17386045.3 and/or 17386046.1 both filed on 6 Dec. 2017 and incorporated herein by reference.

To enable decoding of the portion of data, use of some additional data such as metadata may be required. This metadata may be present in the portion of data itself (for example, the portion of data may include a header field containing said metadata and a payload field containing data to be decoded), or could be received as part of a separate data field, such as a data field including metadata for multiple portions of data (e.g., for all the Streams in a Surface, wherein Surface is described elsewhere) with the portions of data included in a payload field. This separate data field may be received prior to the portion of data. The header field of the portion of data may be decoded ahead of the payload field in order to enable decoding of the data to be decoded. This separate data field may be decoded ahead of a portion of data. The metadata themselves may be associated with the elementary data structure that describes the metadata, for example the data structure called Tableau as further described in the present application and other applications such as the above-mentioned European patent application No. 17386045.3 and/or 17386046.1.

Note that Tile and Tableau are two embodiments of the same data structure called Tessera, as further described in the present application and other applications by the same applicant such as the above-mentioned European patent application No. 17386045.3 and/or 17386046.1.

As discussed above, the data stream (e.g., Bytestream) may include multiple portions of data. Typically, there are no gaps between different portions of data—in other words, the last byte (or bit) of a first portion of data is followed in the data stream by the first byte (or bit) of a second portion of data. The metadata may be used to indicate a length associated with a portion of data (e.g., a StreamLength). These lengths can range from zero to an arbitrary maximum number of bytes associated with a portion of stream.

Figure 15:
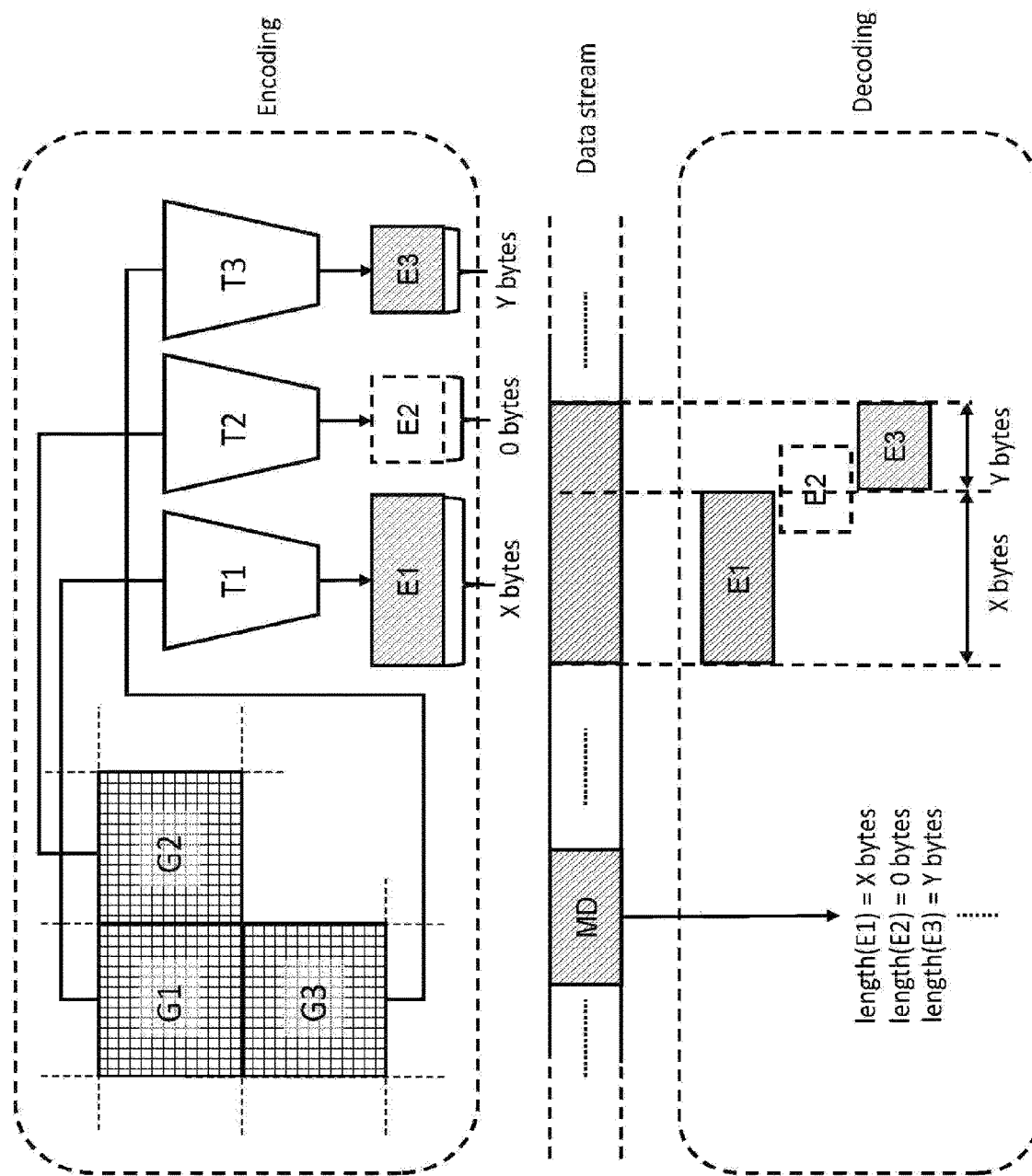
FIG. 15 illustrates an elementary data structure.

During encoding, the data to be encoded (for example, transformed residual data) are processed so that they are divided into groupings of data, with each grouping of data associated with an elementary data structure (e.g., Tessera) as discussed above. For example, with reference to FIG. 15, a first grouping of data G1 may be associated with a first elementary data structure T1 and gets encoded as first encoded data set E1, a second grouping of data may be associated with a second elementary data structure T2 and gets encoded as second encoded data set E2, a third grouping of data G3 may be associated with a third elementary data structure T3 and gets encoded as first encoded data set E1, and so forth. When transmitting to the decoder, a data stream would need to be created, said data stream being formed by a sequence of bytes corresponding to the sequence of encoded data sets, first E1, then E2, then E3 and so forth.

Since the data to be encoded may be sparse in nature (e.g., many of those data to be encoded are either zero or below a certain threshold), some of these groupings of data to be encoded may be completely empty, for example G2 may be completely empty. That means that whilst G1 and G3 contains some data to be decoded and therefore the corresponding encoded data sets E1 and E3, respectively, contains data to be decoded, G2 does not contains any data and therefore the corresponding encoded data set E2 contains no data. Accordingly, the data stream will contain a first portion of data corresponding to E1 and a second portion of data corresponding to E3, with no portion of data corresponding to E2. Since the decoding module would not know a priori that there is no portion of data corresponding to E2, and since the data stream as discussed above has no gaps, the decoder needs to receive information about the length of each of the portion of data to reconstruct and decode the various groupings of data. Accordingly, the metadata MD will contain information about the length of the various portions of data in the data stream. In the exemplary FIG. 15, E1 has length of X bytes, E2 has a length of 0 bytes, E3 has a length of Y bytes.

The decoding module will extract the length information from the metadata MD, and based on it extract from the data stream the corresponding portions of data. With reference to the exemplary FIG. 15, the decoding module extracts the length of E1 as X bytes, Accordingly, the first X bytes of the payload data will be associated with E1. Further, since the decoding module would extract the length of E2 as 0 bytes whilst the length of E3 as Y bytes, the decoding module will associate the next X bytes in the payload data with E3, therefore knowing that E2 has no data associated with it. Accordingly, the decoding module will decode E1 and E3 to arrive at the reconstructed versions of, respectively, groupings of data G1 and grouping of data G3, but it will not reconstruct any grouping of data G2.

As described in the present application and other applications such as the above-mentioned European patent application No. 17386045.3 and/or 17386046.1, the data to be decoded are organised in tiers of Tesserae, with the top Tier (Tier 0) being the Tesserae associated with transformed residual data (also known as Tiles), Tier-1 being the Tesseare associated with metadata of the Tiles on Tier 0 (these Tesserae also known as Tableaux), Tier-2 being the Tesserae associated with metadata of the Tableaux of Tier-1, and so on and so forth. These metadata could be, for example, the length of the portions of data associated with the Tiles (if we are referring to Tier-1) or the length of the portions of data associated with the Tableaux (if we are referring to Tier-2).

Accordingly, when a decoding module receives the data stream it shall extract information about the length of the portions of data associated with the various Tesserae.

Tesserae are decoded in phases, each phase corresponding to decoding a Tier. This is further described in the present patent application. A Tableau tier decoding phase involves using Streamlengths to "find" the Tableaux for that Tier, then decoding the "found" Tesserae to obtain more Streamlengths. The Tile tier decoding phase involves using Streamlengths to find the Tiles, and decoding the "found" Tiles to get residuals (all other residuals being zero).

Figure 19:
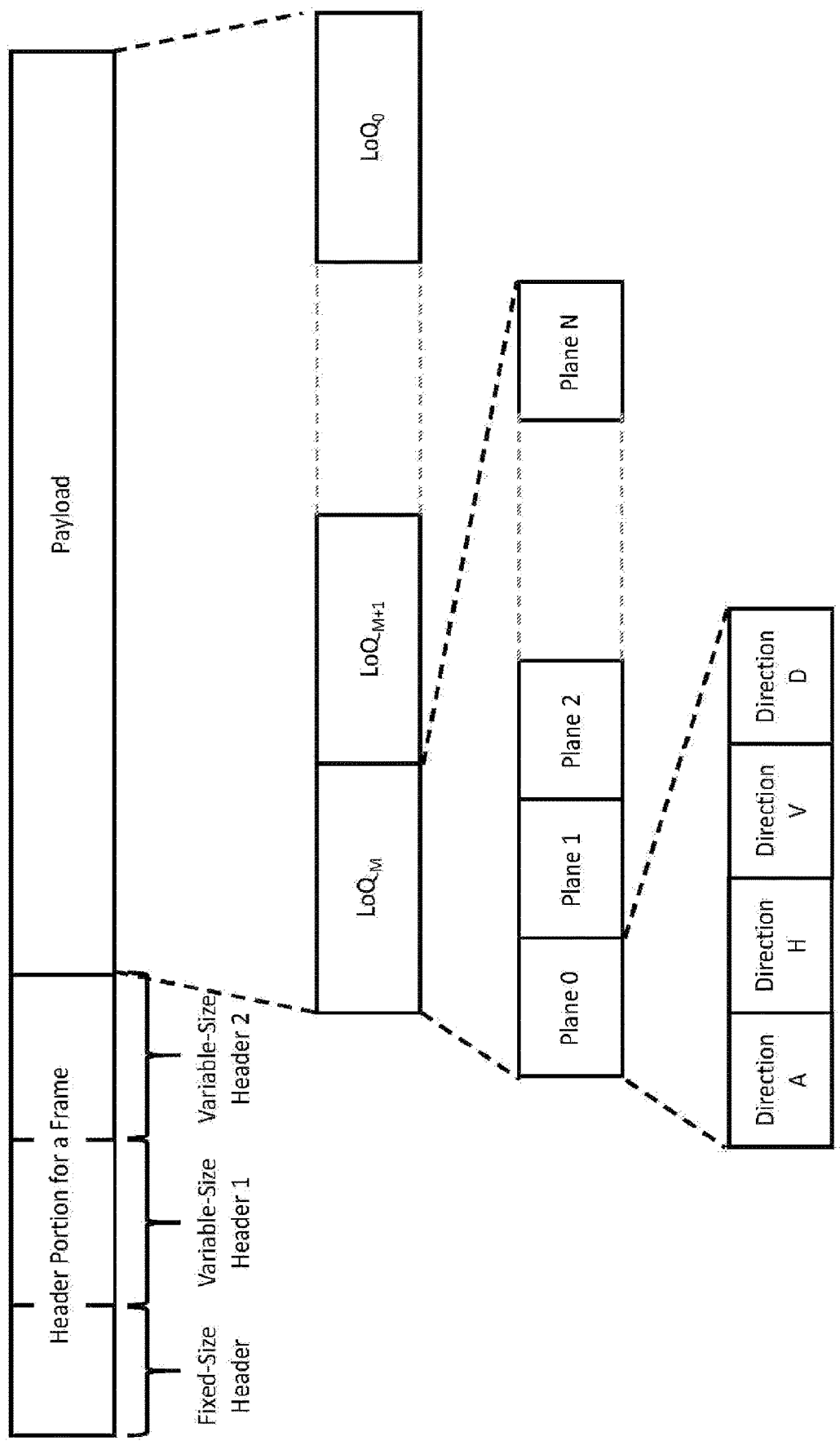
FIG. 19 illustrates a bytestream structure for a frame.

As shown in FIG. 19, the bytestream may include multiple fields, namely one or more headers and a payload. In general, a payload includes the actual data to be decoded, whilst the headers provide information needed when decoding the payload. The payload may include information about a plurality of planes. In other words, the payload is subdivided in portions, each portion corresponding to a plane. Each plane further comprises multiple sub-portions, each sub-portion associated with a level of quality. The logical structure of a Payload is an array of multi-tiered Tableaux, which precedes the Tile Tier with Tiles containing Residuals at their Top Layer. The data in the Payload that represents a Tessera shall be a Stream. In the present example, Streams are ordered by LoQ, then by Plane, then by direction and then by Tier. However, the Streams can be ordered in any other way, for example first direction, then LoQ, the Plane, then Tier. The order between directions, LoQ and Planes can be done in any way, and the actual order can be inferred by using the information in the header, for example the stream offsets info.

The payload contains a series of streams, each stream corresponding to an encoded tessera. For the purpose of this example, we assume that the size of a tessera is 16×16. First, the decoding module would derive a root tableau (for example, associated with a first direction of a first LoQ within a first plane). From the root tableau, the decoding module would derive up to 256 attributes associated with the corresponding up to 256 tesserae associated with it and which lie in the tier above the root tier (first tier). In particular, one of the attributes is the length of the stream associated with the tessera. By using said streamlengths, the decoding module can identify the individual streams and, if implemented, decode each stream independently.

Then, the decoding module would derive, from each of said tessera, attributes associated with the 256 tesserae in the tier above (second tier). One of these attributes is the length of the stream associated with the tessera. By using said streamlengths, the decoding module can identify the individual streams and, if implemented, decode each stream independently. The process will continue until the top tier is reached. Once the top tier has been reached, the next stream in the bytestream would correspond to a second root tableau (for example, associated with a second direction of a first LoQ within a first plane), and the process would continue in the same way.

FIG. 3 shows an example of the hierarchy of tesserae associated with a picture, in the present example including two tiers plus the root tier.

Figure 16:
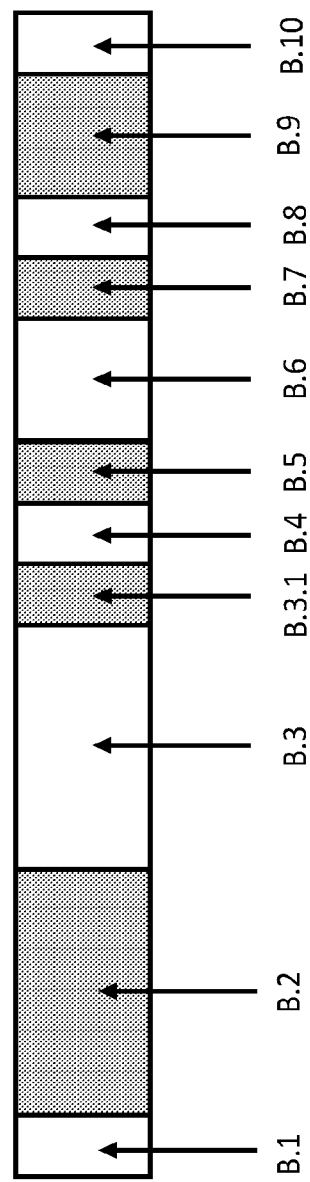
FIG. 16 illustrates a fixed-size header.

The bytestream may include a fixed-sized header, i.e. a header whose byte/bit length is fixed. The header may include a plurality of fields. FIG. 16 shows an example of said fixed-sized header.

The fixed-sized header may include a first field indicating a version of the bytestream format (B.1—also described as format_version: unit8). In an embodiment, this first field may include 8 bits (or equivalently 1 byte). This field may allow flexibility in the encoding/decoding process to use, adapt and/or modify the version of the bytestream format and inform a decoding module of said version. In this way, it is possible to use multiple different version of the encoding/decoding format and allow the decoding module to determine the correct version to be used.

A decoding module would obtain said first field from the bytestream and determine, based on the value included in said first field, a version of the encoding format to be used in the decoding process of said bytestream. The decoding module may use and/or implement a decoding process to adapt to said version.

The fixed-sized header may include a second field indicating a size of the picture frame encoded with a specific bytestream (B.2—also described as picture_size: unit32). The size of the picture frame may actually correspond to the size of the bytestream associated with that picture frame. In an embodiment, this first field may include 32 bits (or equivalently 4 bytes). The size of the picture frame may be indicated in units of bytes, but other units may be used. This allows the encoding/decoding process flexibility in encoding picture frames of different size (e.g., 1024×720 pixels, 2048×1540 pixels, etc.) and allow the decoding module to determine the correct picture frame size to be used for a specific bytestream.

A decoding module would obtain said second field from the bytestream and determine, based on the value included in said second field, a size of a picture frame corresponding to said bytestream. The decoding module may use and/or implement a decoding process to adapt to said size, and in particular to reconstruct the picture frame from the encoded bytestream to fit into said size.

The fixed-sized header may include a third field indicating a recommended number of bits/bytes to fetch/retrieve at the decoding module when obtaining the bytestream (B.3—also described as recommended_fetch_size: unit32). In an embodiment, this first field may include 32 bits (or equivalently 4 bytes). This field may be particularly useful in certain applications and/or for certain decoding modules when retrieving the bytestream from a server, for example to enable the bytestream to be fetched/retrieved at the decoding module in "portions". For example, this may enable partial decoding of the bytestream (as further described, for example, in European patent application No 17386047.9 filed on 6 Dec. 2017 by the same applicant whose contents are included in their entirety by reference) and/or optimise the retrieval of the bytestream by the decoding module (as for example further described in European patent application No 12759221.0 filed on 20 Jul. 2012 by the same applicant whose contents are included in their entirety by reference).

A decoding module would obtain said third field from the bytestream and determine, based on the value included in said third field, a number of bits and/or bytes of the bytestream to be retrieved from a separate module (for example, a server and/or a content delivery network). The decoding module may use and/or implement a decoding process to request to the separate module said number of bits and/or bytes from the bytestream, and retrieve them from the separate module.

The fixed-sized header may include another field indicating a generic value in the bytestream (B.3.1—also described as element_interpretation: unit8). In an embodiment, this first field may include 8 bits (or equivalently 1 byte).

A decoding module would obtain said another field from the bytestream and determine, based on the value included in said another field, a value indicated by the field.

The fixed-sized header may include a fourth field indicating various system information, including the type of transform operation to be used in the decoding process (B.4—also described as pipeline: unit8). In an embodiment, this first field may include 8 bits (or equivalently 1 byte). A transform operation is typically an operation that transform a value from an initial domain to a transformed domain. One example of such a transform is an integer composition transform. Another example of such a transform is a composition transform. The composition transform (integer and/or standard) are further described in European patent application No. 13722424.2 filed on 13 May 2013 by the same applicant and incorporated herein by reference.

A decoding module would obtain said fourth field from the bytestream and determine, based on at least one value included in said fourth field, a type of transform operation to be used in the decoding process. The decoding module may configure the decoding process to use the indicated transform operation and/or implement a decoding process which uses the indicated transform operation when converting one or more decoded transformed coefficient and/or value (e.g., a residual) into an original non-transform domain.

The fixed-sized header may include a fifth field indicating a type of up-sampling filtering operation to be used in the decoding process (B.5—also described as upsampler: unit8). In an embodiment, this first field may include 8 bits (or equivalently 1 byte). An up-sampling filtering operation comprises a filter which applies certain mathematical operations to a first number of samples/values to produce a second number of samples/values, wherein the second number is higher than the first number. The mathematical operations can either be pre-defined, adapted either based on an algorithm (e.g., using a neural network or some other adaptive filtering technique) or adapted based on additional information received at the decoding module. Examples of such up-sampling filtering operations comprise a Nearest Neighbour filtering operation, a Sharp filtering operation, a Bi-cubic filtering operation, and a Convolutional Neural Network (CNN) filtering operations. These filtering operations are described in further detail in the present application, as well as in UK patent application No. 1720365.4 filed on 6 Dec. 2017 by the same applicant and incorporated herein by reference.

A decoding module would obtain said fifth field from the bytestream and determine, based on at least one value included in said fifth field, a type of up-sampling operation to be used in the decoding process. The decoding module may configure the decoding process to use the indicated up-sampling operation and/or implement a decoding process which uses the indicated up-sampling operation. The indication of the upsampling operation to be used allows flexibility in the encoding/decoding process, for example to better suit the type of picture to be encoded/decoded based on its characteristics.

The fixed-sized header may include a sixth field indicating one or more modifying operations used in the encoding process when building the fixed-sized header and/or other headers and/or to be used in the decoding process in order to decode the bytestream (see below) (B.6—also described as shortcuts: shortcuts_t). These modifying operations are also called shortcuts. The general advantage provided by these shortcuts is to reduce the amount of data to be encoded/decoded and/or to optimise the execution time at the decoder, for example by optimising the processing of the bytestream.

A decoding module would obtain said sixth field from the bytestream and determine, based on at least one value included in said sixth field, a type of shortcut used in the encoding process and/or to be used in the decoding process. The decoding module may configure the decoding process to adapt its operations based on the indicated shortcut and/or implement a decoding process which uses the indicated shortcut.

The fixed-sized header may include a seventh field indicating a first number of bits to be used to represent an integer number and a second number of bits to be used to represent a fractional part of a number (B.7—also described as element descriptor: tuple (unit5, unit3)). In an embodiment, this first field may include 8 bits (or equivalently 1 byte) sub-divided in 5 bits for the first number of bits and 3 bits for the second number of bits.

A decoding module would obtain said seventh field from the bytestream and determine, based on at least one value included in said seventh field, how many bits to dedicate to represent the integer part of a number that has both integer and fractional parts and how many bits to dedicate to a fractional number.

The fixed-sized header may include an eighth field indicating a number of planes forming a frame and to be used when decoding the bytestream (B.8—also described as num_plane: unit8). In an embodiment, this first field may include 8 bits (or equivalently 1 byte). A plane is defined in the present application and is, for example, one of the dimensions in a color space, for examples the luminance component Y in a YUV space, or the red component R in an RGB space.

A decoding module would obtain said eighth field from the bytestream and determine, based on at least one value included in said fifth field, the number of planes included in a picture.

The fixed-sized header may include a ninth field indicating a size of an auxiliary header portion included in a separate header—for example the First Variable-Size Header or the Second Variable-Size Header (B.9—also described as aux header size: unit16). In an embodiment, this first field may include 16 bits (or equivalently 2 byte). This field allows the encoding/decoding process to be flexible and define potential additional header fields.

A decoding module would obtain said ninth field from the bytestream and determine, based on at least one value included in said ninth field, a size of an auxiliary header portion included in a separate header. The decoding module may configure the decoding process to read the auxiliary header in the bytestream.

The fixed-sized header may include a tenth field indicating a number of auxiliary attributes (B.10—also described as num_aux_the_attribute: unit4 and num_aux_tableau_attribute: unit4). In an embodiment, this first field may include 8 bits (or equivalently 1 byte) split into two 4-bits sections. This field allows the encoding/decoding process to be flexible and define potential additional attributes for both Tiles and Tableaux. These additional attributes may be defined in the encoding/decoding process.

A decoding module would obtain said tenth field from the bytestream and determine, based on at least one value included in said tenth field, a number of auxiliary attributes associated with a tile and/or a number of auxiliary attributes associated with a tableau. The decoding module may configure the decoding process to read said auxiliary attributes in the bytestream.

Figure 17:
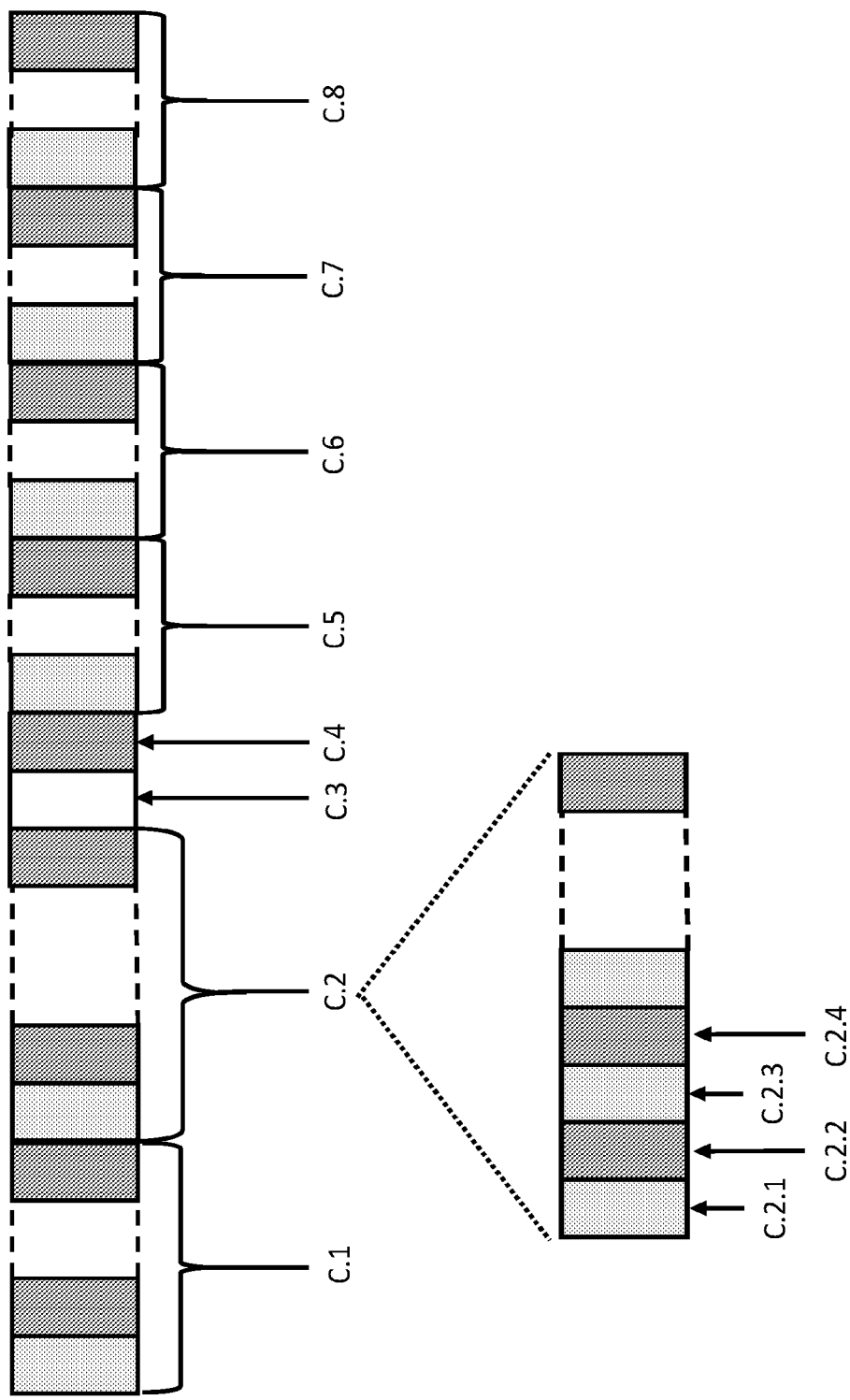
FIG. 17 illustrates a first variable-sized header.

The bytestream may include a first variable-sized header, i.e. a header whose byte/bit length is changeable depending on the data being transmitted within it. The header may include a plurality of fields. FIG. 17 shows an example of said first variable-sized header.

The first variable-sized header may include a first field indicating a size of a field associated with an auxiliary attribute of a tile and/or a tableau (C.1—also described as aux_attribute_sizes: until 6[num_aux_the_attribute+num_aux_tableau_attribute]). In an embodiment, the second field may include a number of sub-fields, each indicating a size for a corresponding auxiliary attribute of a tile and/or a tableau. The number of these sub-fields, and correspondingly the number of auxiliary attributes for a tile and/or a tableau, may be indicated in a field of a different header, for example the fixed header described above, in particular in field B.10. In an embodiment, this first field may include 16 bits (or equivalently 2 bytes) for each of the auxiliary attributes. Since the auxiliary attributes may not be included in the bytestream, this field would allow the encoding/decoding process to define the size of the auxiliary attributes were they to be included in the bytestream. This contrasts, for example, with the attributes (see for example C.2 below) which typically are pre-defined in size and therefore their size does not need to be specified and/or communicated.

A decoding module would obtain said first field from the bytestream and determine, based on a value included in said first field, a size of an auxiliary attribute associated with a tessera, (i.e., either a tile or a tableau). In particular, the decoding module may obtain from said first field in the bytestream, a size of an auxiliary attribute for each of the auxiliary attributes which the decoding module is expecting to decode, for example based on information received separately about the number of auxiliary attributes to be specified. The decoding module may configure the decoding process to read the auxiliary attributes in the bytestream.

The first variable-sized header may include a second field indicating, for each attribute of a tile and/or a tableau, a number of different versions of the respective attribute (C.2—also described as nums_attribute: until6[4+num_aux_the_attribute+num_aux_tableau_attribute]). The second field may include a number of sub-fields, each indicating for a corresponding attribute a number of different version of said respective attribute. The number of these sub-fields, and correspondingly the number of standard attributes and auxiliary attributes for a tile and/or a tableau, may be indicated at least in part in a field of a different header, for example the fixed header described above, in particular in field B.10. The attributes may comprise both standard attributes associated with a tile and/or a tableau and the auxiliary attributes as described above. In an embodiment, there are three standard attributes associated with a tile (e.g., Residual Statistics, T-Node Statistics and Quantization Parameters) and two standard attributes associated with a tableau (e.g., Streamlengths Statistics and T-Node Statistics). In an embodiment, since the T-Node Statistics for the tiles and the tableaux may be the same, they may only require to be specified once. In such embodiment, only four different standard attributes will need to be included (and therefore only four sub-fields, C.2.1 to C.2.4, each associated with one of the four standard attributes Residual Statistics, T-Node Statistics, Quantization Parameters and Streamlengths Statistics, are included in the second field, each indicating a number of different versions of the respective attribute). Accordingly, there may be four different sub-fields in said second field, each indicating the number of standard attributes for a tile and/or a tableau which need to be specified for the decoding process. By way of example, if the sub-field associated with the T-Node Statistics indicate a number 20, it means that there will be 20 different available versions of T-Node Statistics to use for tiles and/or attributes.

A decoding module would obtain said second field from the bytestream and determine, based on a value included in said second field, a number of different versions of a respective attribute, said attribute associated with a tile and/or a tableau. The decoding module may configure the decoding process to use the available versions of the corresponding attributes.

The first variable-sized header may include a third field indicating a number of different groupings of tiles, wherein each grouping of tiles is associated with a common attribute (C.3—also described as num_tileset: unit16). In an embodiment, this first field may include 16 bits (or equivalently 2 bytes). In an embodiment, the common attribute may be the T-Node Statistics for a tile. For example, if a grouping of tiles (also known as "tileset") is associated with the same T-node Statistics, it means that all the tiles in that grouping shall be associated with the same T-Node Statistics. The use of grouping of tiles sharing one or more common attributes allows the coding and decoding process to be flexible in terms of specifying multiple versions of a same attribute and associate them with the correct tiles. For example, if a group of tiles belongs to "Group A", and "Group A" is associated with "Attribute A" (for example, a specific T-Node Statistics), then all the tiles in Group A shall use that Attribute A. Similarly, if a group of tiles belongs to "Group B", and "Group B" is associated with "Attribute B" (for example, a specific T-Node Statistics different from that of Group A), then all the tiles in Group B shall use that Attribute B. This is particularly useful in allowing the tiles to be associated with a statistical distribution as close as possible to that of the tile but without having to specify different statistics for every tile. In this way, a balance is reached between optimising the entropy encoding and decoding (optimal encoding and decoding would occur if the distribution associated with the tile is the exact distribution of that tile) whilst minimising the amount of data to be transmitted. Tiles are grouped, and a "common" statistics is used for that group of tiles which is as close as possible to the statistics of the tiles included in that grouping. For example, if we have 256 tiles, in an ideal situation we would need to send 256 different statistics, one for each of the tiles, in order to optimise the entropy encoding and decoding process (an entropy encoder/decoder is more efficient the more the statistical distribution of the encoded/decoded symbols is close to the actual distribution of said symbols). However, sending statistics is impractical and expensive in terms of compression efficiency. So, typical systems would send only one single statistics for all the 256 tiles. However, if the tiles are grouped into a limited number of groupings, for example 10, with each tile in each grouping having similar statistics, then only 10 statistics would need to be sent. In this way, a better encoding/decoding would be achieved than if only one common statistics was to be sent for all the 256 tiles, whilst at the same time sending only 10 statistics and therefore not compromising too much the compression efficiency.

A decoding module would obtain said third field from the bytestream and determine, based on a value included in said third field, a number of different groupings of tiles. The decoding module may configure the decoding process to use, when decoding a tile corresponding to a specific grouping, one or more attributes associated with said grouping.

The first variable-sized header may include a fourth field indicating a number of different groupings of tableaux, wherein each grouping of tableaus is associated with a common attribute (C.4—also described as num_tableauset: unit16). In an embodiment, this fourth field may include 16 bits (or equivalently 2 bytes). This field works and is based on the same principles as the third field, except that in this case it refers to tableaux rather than tiles.

A decoding module would obtain said fourth field from the bytestream and determine, based on a value included in said fourth field, a number of different groupings of tableaux. The decoding module may configure the decoding process to use, when decoding a tableau corresponding to a specific grouping, one or more attributes associated with said grouping.

The first variable-sized header may include a fifth field indicating a width for each of a plurality of planes (C.5—also described as widths: unit16[num_plane]). In an embodiment, this fifth field may include 16 bits (or equivalently 2 bytes) for each of the plurality of planes. A plane is further defined in the present specification, but in general is a grid (usually a two-dimensional one) of elements associated with a specific characteristic, for example in the case of video the characteristics could be luminance, or a specific color (e.g. red, blue or green). The width may correspond to one of the dimensions of a plane. Typically, there are a plurality of planes.

A decoding module would obtain said fifth field from the bytestream and determine, based on a value included in said fifth field, a first dimension associated with a plane of elements (e.g., picture elements, residuals, etc.). This first dimension may be the width of said plane. The decoding module may configure the decoding process to use, when decoding the bytestream, said first dimension in relation to its respective plane.

The first variable-sized header may include a sixth field indicating a width for each of a plurality of planes (C.6—also described as heights: unit16[num_plane]). In an embodiment, this sixth field may include 16 bits (or equivalently 2 bytes) for each of the plurality of planes. The height may correspond to one of the dimensions of a plane.

A decoding module would obtain said sixth field from the bytestream and determine, based on a value included in said sixth field, a second dimension associated with a plane of elements (e.g., picture elements, residuals, etc.). This second dimension may be the height of said plane. The decoding module may configure the decoding process to use, when decoding the bytestream, said second dimension in relation to its respective plane.

The first variable-sized header may include a seventh field indicating a number of encoding/decoding levels for each of a plurality of planes (C.7—also described as num_loqs: unit8[num_plane]). In an embodiment, this seventh field may include 16 bits (or equivalently 2 bytes) for each of the plurality of planes. The encoding/decoding levels correspond to different levels (e.g., different resolutions) within a hierarchical encoding process. The encoding/decoding levels are also referred in the application as Level of Quality A decoding module would obtain said seventh field from the bytestream and determine, based on a value included in said seventh field, a number of encoding levels for each of a plurality of planes (e.g., picture elements, residuals, etc.). The decoding module may configure the decoding process to use, when decoding the bytestream, said number of encoding levels in relation to its respective plane.

The first variable-sized header may include an eighth field containing information about the auxiliary attributes (C.8—also described as aux header: unit8[aux header size]). In an embodiment, this eight field may include a plurality of 8 bits (or equivalently 1 byte) depending on a size specified, for example, in a field of the fixed header (e.g., B.9)

A decoding module would obtain said eighth field from the bytestream and determine information about the auxiliary attributes. The decoding module may configure the decoding process to use, when decoding the bytestream, said information to decode the auxiliary attributes.

Figure 18:
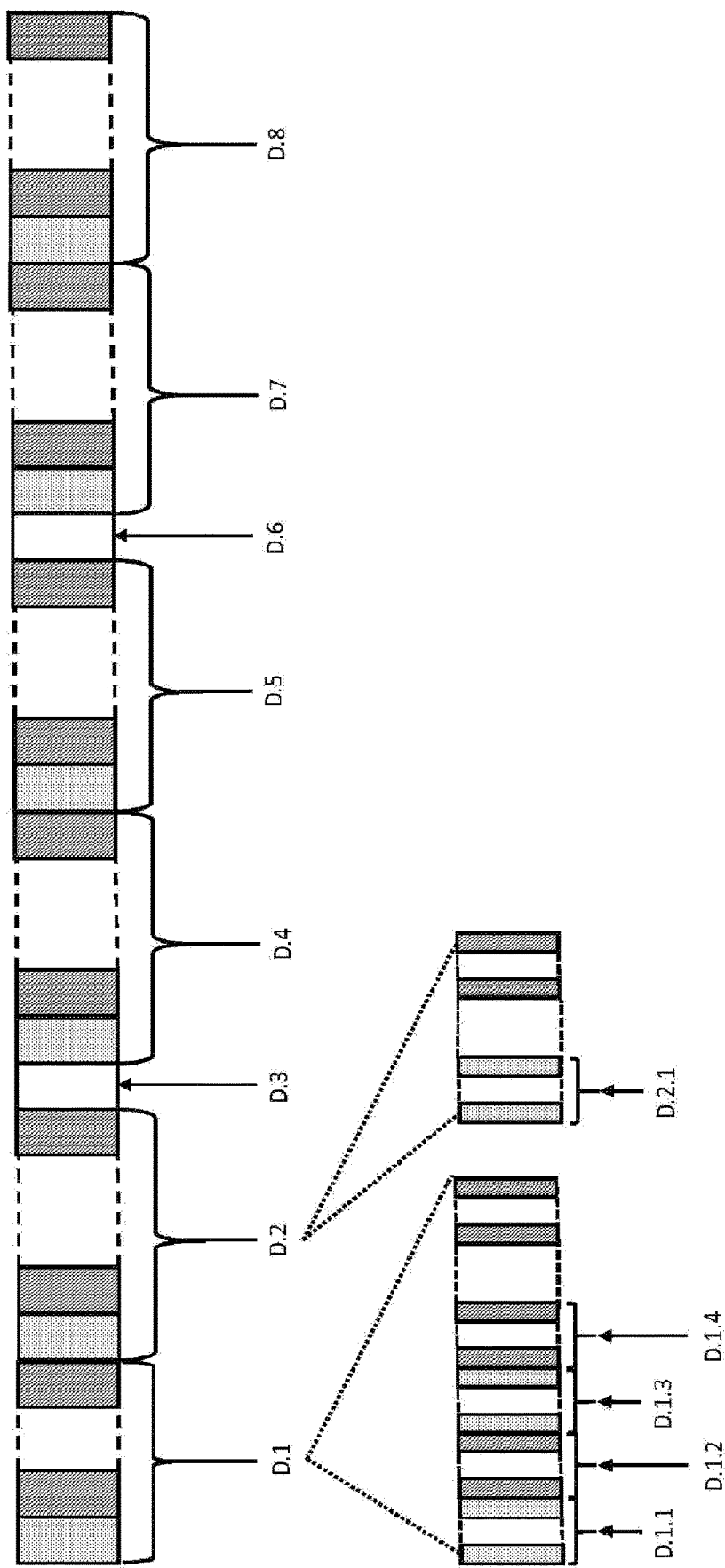
FIG. 18 illustrates a second-variable sized header.

The bytestream may include a second variable-sized header, i.e. a header whose byte/bit length is changeable depending on the data being transmitted within it. The header may include a plurality of fields. FIG. 18 shows an example of said second variable-sized header.

The second variable-sized header may include a first field containing, for each attribute, information about one or more statistics associated with the respective attribute (see D.1). The number of statistics associated with a respective attribute may be derived separately, for example via field C.2 as described above. The statistics may be provided in any form. In an embodiment of the present application, the statistics is provided using a particular set of data information which includes information about a cumulative distribution function (type residual_stat_t).

In particular, a first group of sub-fields in said first field may contain information about one or more statistics associated with residuals values (also D.1.1—also described as residual_stats: residual_stat_t[nums_attribute[0]]). In other words, the statistics may identify how a set of residual data are distributed. The number of statistics included in this first group of sub-fields may be indicated in a separate field, for example in the first sub-field C.2.1 of field C.2 as described above (also indicated as nums_attribute[0]). For example, if nums_attribute[0] is equal to 10, then there would be 10 different residuals statistics contained in said first field. For example, the first 10 sub-fields in the first field correspond to said different 10 residuals statistics.

A second group of sub-fields in said first field may contain information about one or more statistics associated with nodes within a Tessera (also D.1.2—also described as tnode_stats: tnode_stat_t[nums_attribute[1]]). In other words, the statistics may identify how a set of nodes are distributed. The number of statistics included in this second group of sub-fields may be indicated in a separate field, for example in the second sub-field C.2.2 of field C.2 as described above (also indicated as nums_attribute[1]). For example, if nums_attribute[1] is equal to 5, then there would be 5 different t-node statistics contained in said first field. For example, considering the example above, after the first 10 sub-fields in the first field, the next 5 sub-fields correspond to said 5 different t-node statistics.

A third group of sub-fields in said first field may contain information about one or more quantization parameters (also D.1.3—also described as quantization parameters: quantization_parameters_t[nums_attribute[2]]). The number of quantization parameters included in this third group of sub-fields may be indicated in a separate field, for example in the third sub-field C.2.3 of field C.2 as described above (also indicated as nums_attribute[2]). For example, if nums_attribute[2] is equal to 10, then there would be 10 different quantization parameters contained in said first field. For example, considering the example above, after the first 15 sub-fields in the first field, the next 10 sub-fields correspond to said 10 different quantization parameters.

A fourth group of sub-fields in said first field may contain information about one or more statistics associated with streamlengths (also D.1.4—also described as stream_length_ stats: stream_length_stat_t[nums_attribute[3]]). In other words, the statistics may identify how a set of streamlengths are distributed. The number of statistics included in this fourth group of sub-fields may be indicated in a separate field, for example in the fourth sub-field C.2.4 of field C.2 as described above (also indicated as nums_attribute[3]). For example, if nums_attribute[4] is equal to 12, then there would be 12 different streamlengths statistics contained in said first field. For example, considering the example above, after the first 25 sub-fields in the first field, the next 12 sub-fields correspond to said 12 different streamlengths statistics.

Further groups of sub-fields in said first field may contain information about auxiliary attributes (also described as aux_atttributes: unit1[aux_attributes_size[i]][num_ aux_ the_ attribute+num_aux_tableau_attribute]). The number of auxiliary attributes may be indicated in another field, for example in field C.2 as described above.

Specifying one or more versions of the attributes (e.g., statistics) enables flexibility and accuracy in the encoding and decoding process, because for instance more accurate statistics can be specified for a specific grouping of tesserae (tiles and/or tableaux), thus making it possible to encode and/or decode said groupings in a more efficient manner.

A decoding module would obtain said first field from the bytestream and determine, based on the information contained in said first field, one or more attributes to be used during the decoding process. The decoding module may store the decoded one or more attributes for use during the decoding process. The decoding module may, when decoding a set of data (for example, a tile and/or a tableau) and based on an indication of attributes to use in relation to that set of data, retrieve the indicated attributes from the stored decoded one or more attributes and use it in decoding said set of data.

The second variable-sized header may include a second field containing, for each of a plurality of grouping of tiles, an indication of a corresponding set of attributes to use when decoding said grouping (D.2—also described as tilesets: unit16[3+num_aux_the_attributes] [num_tiles]). The number of groupings of tiles may be indicated in a separate field, for example in field C.3 described above. This second field enables the encoding/decoding process to specify which of the sets of attributes indicated in field D.1 described above is to be used when decoding a tile.

A decoding module would obtain said second field from the bytestream and determine, based on the information contained in said second field, which of a set of attributes is to be used when decoding a respective grouping of tiles. The decoding module would retrieve from a repository storing all the attributes the ones indicated in said second field, and use them when decoding the respective grouping of tiles. The decoding process would repeat said operations when decoding each of the plurality of grouping of tiles.

By way of example, and using the example described above in relation to field D.1, let's assume that for a first grouping of tiles the set of attributes indicated in said second field corresponds to residuals statistics No. 2, t_node statistics No. 1 and to quantization parameter No. 4 (we assume for simplicity that there are no auxiliary attributes). When the receiving module receives said indication, it would retrieve from the stored attributes (as described above) the second residuals statistics from the 10 stored residuals statistics, the first t node statistics from the 5 stored t node statistics and the fourth quantization parameter from the 10 stored quantization parameters.

The second variable-sized header may include a fourth field containing, for each of a plurality of grouping of tableaux, an indication of a corresponding set of attributes to use when decoding said grouping (D.4—also described as tableausets: unit16[2+num_aux_tableaux_attributes][num_tableaux]). The number of groupings of tableaux may be indicated in a separate field, for example in field C.4 described above. This fourth field enables the encoding/decoding process to specify which of the sets of attributes indicated in field D.1 described above is to be used when decoding a tableau.

The principles and operations behind this fourth field corresponds to that described for the second field, with the difference that in this case it applies to tableaux rather than tiles. In particular, a decoding module would obtain said fourth field from the bytestream and determine, based on the information contained in said fourth field, which of a set of attributes is to be used when decoding a respective grouping of tableaux. The decoding module would retrieve from a repository storing all the attributes the ones indicated in said fourth field, and use them when decoding the respective grouping of tableaux. The decoding process would repeat said operations when decoding each of the plurality of grouping of tableaux.

The second variable-sized header may include a fifth field containing, for each plane, each encoding/decoding level and each direction, an indication of a corresponding set of attributes to use when decoding a root tableau (D.5—also described as root_tableauset_indices: unit16[loq_idx][num_planes][4]). This fifth field enables the encoding/decoding process to specify which of the sets of attributes indicated in field D.1 described above is to be used when decoding a root tableau.

A decoding module would obtain said fifth field from the bytestream and determine, based on the information contained in said fifth field, which of a set of attributes is to be used when decoding a respective root tableau. The decoding module would retrieve from a repository storing all the attributes the ones indicated in said fifth field, and use them when decoding the respective grouping of tiles.

In this way, the decoding module would effectively store all the possible attributes to be used when decoding tiles and/or tableaux associated with that bytestream, and then retrieve for each of a grouping of tiles and/or tableaux only the sub-set of attributes indicated in said second field to decode the respective grouping of tiles and/or tableaux.

The second variable-sized header may include a third field containing information about the statistics of the groupings of tiles (D.3—also described as cdf_tilesets: line_segments_cdfl5_t<tilese_index_t>). The statistics may provide information about how many times a certain grouping of tiles occurs. The statistics may be provided in the form of a cumulative distribution function. In the present application, the way the cumulative distribution function is provided is identified as a function type, specifically type line_segments_cdfl5_t<x_axis_type>. By using said statistics, the encoding/decoding process is enabled to compress the information about the grouping of tiles (e.g., the indices of tiles) and therefore optimise the process. For example, if there are N different groupings of tiles, and correspondingly N different indexes, rather than transmitting these indexes in an uncompressed manner, which would require 2[log 2N] bits (where [·] is a ceiling function), the grouping can be compressed using an entropy encoder thus reducing significantly the number of bits required to communicate the groupings of tiles. This may represent a significant savings. For example, assume that there are 10,000 tiles encoded in the bytestream, and that these tiles are divided in 100 groupings. Without compressing the indexes, an index needs to be sent together with each tile, meaning that at least 2[log 2100]=7 bits per tile, which means a total of 70,000 bits. If instead the indexes are compressed using an entropy encoder to an average of 1.5 bits per index, the total number of bits to be used would be 15,000, reducing the number of bits to be used by almost 80%.

A decoding module would obtain said third field from the bytestream and determine, based on the information contained in said third field, statistical information about the groupings of tiles. The decoding module would use said statistical information when delving which grouping a tile belongs to. For example, the information about the tile grouping (e.g., tileset index) can be compressed using said statistics and then reconstructed at the decoder using the same statistics, for example using an entropy decoder.

The second variable-sized header may include a sixth field containing information about the statistics of the groupings of tableaux (D.6—also described as cdf_tableausets: line_segments_cdfl52<tableauset_index_t>). The statistics may provide information about how many times a certain grouping of tableaux occurs. The statistics may be provided in the form of a cumulative distribution function.

This field works in exactly the same manner as the third field but for grouping of tableaux rather than grouping of tiles. In particular, a decoding module would obtain said sixth field from the bytestream and determine, based on the information contained in said sixth field, statistical information about the groupings of tableaux. The decoding module would use said statistical information when deriving which grouping a tableau belongs to. For example, the information about the tableau grouping (e.g., tableauset index) can be compressed using said statistics and then reconstructed at the decoder using the same statistics, for example using an entropy decoder.

The second variable-sized header may include a seventh field containing, for each plane, each encoding/decoding level and each direction, an indication of a location, within a payload of the bytestream, of one or more sub-streams (e.g., a Surface) of bytes associated for that respective plane, encoding/decoding level and direction (D.7—also described as root_stream_offsets: root_stream_offset_t[loq_idx][num_planes][4]). The location may be indicated as an offset with respect to the start of the payload. By way of example, assuming 3 planes, 3 encoding/decoding levels and 4 directions, there will be 3*3*4=36 different sub-streams, and correspondingly there will be 36 different indication of locations (e.g., offsets).

A decoding module would obtain said seventh field from the bytestream and determine, based on the information contained in said seventh field, where to find in the payload a specific sub-stream. The sub-stream may be associated with a specific direction contained in a specific plane which is within a specific encoding/decoding level. The decoding module would use said information to locate the sub-stream and decode said sub-stream accordingly. The decoding module may implement, based on this information, decoding of the various sub-stream simultaneously and/or in parallel. This can be advantageous for at least two reasons. First, it would allow flexibility in ordering of the sub-streams. The decoder could reconstruct, based on the location of the sub-streams, to which direction, plane and encoding/decoding level the sub-stream belongs to, without the need for that order to be fixed. Second, it would enable the decoder to decode the sub-streams independently from one another as effectively each sub-stream is separate from the others.

The second variable-sized header may include an eighth field containing, for each plane, each encoding/decoding level and each direction, a size of the Stream of bytes associated with the root tableau (D.8—also described as root stream_lengths: root_stream_length_t[loq_idx][num_planes][4]).

A decoding module would obtain said eighth field from the bytestream and determine, based on the information contained in said eighth field, the length of a stream associated with a root tableau.

The following sets out a decoding process in which the above technical concepts have particular utility. There may be provided a method of reconstructing a received set of encoded data, wherein the set of encoded data comprises first and second component sets, the first component set corresponding to a lower image resolution than the second component set, the method comprising: for each of the first and second component sets: decoding the component set so as to obtain a decoded set, the method further comprising: upscaling the decoded first component set so as to increase the corresponding image resolution of the decoded first component set to be equal to the corresponding image resolution of the decoded second component set, and combining the decoded first and second component sets together so as to produce a reconstructed set.

Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes are available.

Each resolution level corresponds to a level of quality (LoQ). This is a collective term, associated with a plane as defined elsewhere, that describes all new inputs or received component sets, and the output reconstructed image for a cycle of index-m. The reconstructed image in LoQ zero, for instance, is the output of the final cycle of pyramidal reconstruction.

As defined in another part of this document, pyramidal reconstruction may be a process of reconstructing an inverted pyramid starting from the initial LoQ and using cycles by new residuals to derive higher LoQs up to the maximum quality, quality zero, at LoQ zero. A cycle may be thought of as a step in such pyramidal reconstruction, the step being identified by an index-m. The step typically comprises upsampling data output from a possible previous step, for instance, upscaling the decoded first component set, and takes new residual surfaces decoded from new surfaces, sets, as also defined in this disclosure, as further inputs in order to obtain output data to be upsampled in a possible following step. Where only first and second component set are received, the number of LoQs will be two, and no possible following step is present. However, in embodiments wherein the number of component sets, or LoQs, is three or greater, then the output data may be progressively upsampled in the following steps.

The first component set typically corresponds to the initial LoQ, which may be denoted by LoQ 1−N, where N is the number of LoQs in the plane. The value of N is typically given in a byteset header.

Typically, the upscaling of the decoded first component set comprises applying an upsampler to the output of the decoding procedure for the initial LoQ. In preferred embodiments, this involves bringing the resolution of a reconstructed picture output from the decoding of the initial LoQ component set into conformity with the resolution of the second component set, corresponding to 2-N. Typically, the upscaled output from the lower LoQ component set corresponds to a predicted image at the higher LoQ resolution. Owing to the lower-resolution initial LoQ image and the upsampling process, the predicted image typically corresponds to a smoothed or blurred picture.

Adding to this predicted picture higher-resolution details from the LoQ above provides a combined, reconstructed image set. Advantageously, in embodiments where the received component sets for one or more higher-LoQ component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using prior art techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or LoQ, upscaling that reconstructed set, and combining it with the decoded output of the component set or LoQ above, to produce a new, higher resolution reconstructed picture. It will be understood that this may be performed repeatedly, for progressively higher LoQs, depending on the total number of component sets in the received set.

In typical embodiments, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the LoQ one less than the LoQ in question. A received set of component sets in which the linear size of each corresponding image is double with respect to the image size below may facilitate more simple upscaling operations, for example.

In some embodiments, the number of further component sets is two. Thus, in such embodiments, the total number of component sets in the received set is four. This corresponds to the initial LoQ being LoQ-3.

In preferred embodiments, the first component set corresponds to image data, and the second and any further component sets correspond to residual image data. As noted above, the method provides particularly advantageous data rate requirement reductions for a given image size in cases where the lowest LoQ, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial LoQ needs only contain residual data in order to reintroduce the information that may have been lost in down sampling the original image to the lowest LoQ.

The invention claimed is:

1. A method of decoding a received set of encoded data representing information that has been compressed, the encoded data set comprising a plurality of subsets, each subset representing a region of the information that has been compressed, the method comprising:
   receiving the encoded data set;
   retrieving signalled size dimensions of the information that has been compressed;
   based on the signalled size dimensions, identifying a maximum amount of subsets expected in the data set, the subsets comprising a predetermined maximum amount of encoded data elements, and identifying an expected amount of data elements to be represented by each subset;
   decoding the encoded data set to derive a set of data elements based on the expected amount of data elements represented by each subset; and,
   reconstructing the information that has been compressed using the derived set of data elements.

2. The method according to claim 1, wherein the step of identifying an expected amount of data elements within each subset is based on an order the subsets are retrieved from the encoded data set.

3. The method according to claim 1, wherein the step of identifying an expected amount of data elements within each subset is based on a defined mapping order of the subsets to the corresponding region of the information that has been compressed.

4. The method according to claim 3, wherein the step of decoding the encoded dataset comprises masking any data or metadata in the encoded data set which corresponds to a location in the information that has been compressed outside of the signalled size dimensions based on the defined mapping order of the subsets.

5. The method according to any of claim 1, wherein each subset is a data structure comprising metadata elements and data symbols.

6. The method according to claim 5, further comprising:
   based on the signalled size dimensions, identifying which metadata elements comprise relevant metadata and which contain dummy metadata.

7. The method according to claim 6, ignoring dummy metadata.

8. The method according to any of claim 5, further comprising:
   based on the signalled dimensions, identifying a structure of the data structure.

9. The method according to any of claim 5, wherein each data structure is associated with a square array of data elements and wherein each metadata element corresponds to a square sub-array of the square array.

10. The method according to any of claim 5, wherein the data structure only comprises data symbols for information that has been compressed within the size dimensions, based on a defined mapping order of the data symbols to the information that has been compressed.

11. The method according to any of claim 5, wherein the signalled dimensions indicate portions of the data structure do not contain data elements.

12. The method according to any of claim 1, wherein the step of reconstructing comprises:
   mapping each derived data element to a location in an array based on a defined order and the signalled size dimensions, such that derived data elements are placed only at locations within the signalled size dimensions.

13. An apparatus for decoding a received set of encoded data representing information that has been compressed, comprising a processor configured to:
   receive the encoded data set;
   retrieve signalled size dimensions of the information that has been compressed;
   based on the signalled size dimensions, identify a maximum amount of subsets expected in the data set, the subsets comprising a predetermined maximum amount of encoded data elements, and identify an expected amount of data elements to be represented by each subset;
   decode the encoded data set to derive a set of data elements based on the expected amount of data elements represented by each subset; and, reconstruct the information that has been compressed using the derived set of data elements.

14. A method of encoding information to be compressed into a set of encoded data, the encoded data set comprising a plurality of subsets, each subset representing a region of the information that has been compressed, the method comprising:

identifying size dimensions of the information to be compressed;

signalling the size dimensions of the information that has been compressed; and encoding data elements of the information to be compressed into the plurality of subsets, the subsets comprising a predetermined maximum amount of encoded data elements.

15. The method according to claim 14, wherein the step of encoding the data elements comprises inserting data or metadata in the encoded data set which corresponds to a location in the information that has been compressed outside of the signalled size dimensions.

16. The method according to claim 14, wherein each subset is a data structure comprising metadata elements and data symbols.

17. The method according to claim 16, further comprising:

inserting dummy metadata elements in the data structure.

18. The method according to claim 16, wherein each data structure is associated with a square array of data elements and wherein each metadata element corresponds to a square sub-array of the square array.

19. The method according to any of claim 16, wherein the data structure only comprises data symbols for information that has been compressed within the size dimensions, based on a defined mapping order of the data symbols to the information that has been compressed.

20. The method according to claim 14, wherein the step of encoding comprises:

mapping each location in an array to a subset based on a defined order and the signalled size dimensions, such that derived data elements from the encoded data set are placed only at locations within the signalled size dimensions.

* * * * *